United States Patent
van Zelst

(10) Patent No.: US 8,532,202 B2
(45) Date of Patent: Sep. 10, 2013

(54) NEAR SOFT-OUTPUT MAXIMUM LIKELIHOOD DETECTION FOR MULTIPLE-INPUT MULTIPLE-OUTPUT SYSTEMS USING REDUCED LIST DETECTION

(75) Inventor: Albert van Zelst, Woerden (NL)

(73) Assignee: Qualcomm Incorporated, San Diego, CA (US)

( * ) Notice: Subject to any disclaimer, the term of this patent is extended or adjusted under 35 U.S.C. 154(b) by 1073 days.

(21) Appl. No.: 12/334,177

(22) Filed: Dec. 12, 2008

(65) Prior Publication Data
US 2010/0150258 A1 Jun. 17, 2010

(51) Int. Cl.
*H04K 1/10* (2006.01)

(52) U.S. Cl.
USPC .......... 375/260; 375/262; 375/341; 455/13.3; 700/53; 714/794

(58) Field of Classification Search
None
See application file for complete search history.

(56) References Cited

U.S. PATENT DOCUMENTS

| 7,245,666 | B1 | 7/2007 | Gardner et al. | |
|---|---|---|---|---|
| 2003/0123381 | A1* | 7/2003 | Zhuang et al. | 370/208 |
| 2006/0148506 | A1* | 7/2006 | Hoo | 455/522 |
| 2009/0154600 | A1 | 6/2009 | Kim et al. | |
| 2010/0296608 | A1 | 11/2010 | Axnas | |
| 2011/0096858 | A1 | 4/2011 | Klimer | |
| 2012/0051463 | A9 | 3/2012 | Siti et al. | |

FOREIGN PATENT DOCUMENTS

| WO | WO2008027552 A2 | 3/2008 |
|---|---|---|
| WO | WO2008027554 | 3/2008 |

OTHER PUBLICATIONS

A. van Zelst, "MIMO OFDM for wireless LANs", Ph.D. Dissertation, Department of Electrical Engineering, Eindhoven University of Technology, Apr. 2004.
M. Siti and M. P. Fitz, "On Reduced Complexity Soft-Output MIMO ML Detection", asXiv:cs.IT/0603096 v1, Mar. 24, 2006.
Y. Xie, Q. Li and C.N. Georghiades, "On Some Near Optimal Low Complexity Detectors for MIMO Fading Channels", IEEE Transactions on Wireless Communications, vol. 6, Issue 4, Apr. 2007, pp. 1182-1186.
Awater G et al: "Reduced Complexity Space Division Multiplexing Receivers",VTC 2000-Spring. 2000 IEEE 51st. Vehicular Technology Conference Proceedings. Tokyo, Japan, May 15-18, 2000; [IEEE Vehicular Technolgy Conference], New York, NY : IEEE, US, vol. CONF. 51, May 15, 2000, pp. 11-15, XP000970570, ISBN: 978-0-7803-5719-8.

(Continued)

*Primary Examiner* — Adolf Dsouza
(74) *Attorney, Agent, or Firm* — Eric Ho

(57) ABSTRACT

A method and apparatus for generating soft-decision output values for a set of transmitted spatial streams in a multiple-input multiple-output (MIMO) communication system are described. The apparatus includes a processor and memory with executable instructions. A plurality of constellation points for respective transmitted spatial streams are looped over to estimate values for other transmitted streams based at least in part on Reduced List Detection (RLD). The plurality of constellation points is a subset of all possible constellation points determined around a spatial stream where more constellation points are assigned to spatial streams with a weaker signal strength than for spatial streams with a stronger signal strength. A set of distance metrics as values of the plurality of constellation points for the respective transmitted spatial streams are determined. Soft-decision outputs for the respective transmitted streams based at least in part on the set of distance metrics are generated.

26 Claims, 15 Drawing Sheets

(56) References Cited

OTHER PUBLICATIONS

Chan-Ho An et al: "Lattice Reduction Aided Detection with Reduced Complexity for Time-Correlated MIMO Channel", Signals, Systems and Computers, 2007. ACSSC 2007. Conference Record of the Forty-First Asilomar Conference on, IEEE, Piscataway, NJ, USA, Nov. 4, 2007, pp. 1554-1558, XP031242342, ISBN: 978-1-4244-2109-1.

International Search Report and Written Opinion—PCT/US2009/067522—International Search Authority, European Patent Office, Jan. 17, 2011.

Tomasoni, Alessandro et al.: "Turbo-LORD: MAP-Approaching Soft-Input Soft-Output Detector for Iterative MIMO Receivers" IEEE GLOBECOM 2007 Proceedings, Global Telecommunications Conference. Piscataway, NJ, USA, (Nov. 1, 2007), pp. 3504-3508, XP031196593, ISBN: 978-1-4244-1042-2.

Detector for iterative MIMO Recievers IEEE Globecom 2007 Proceedings, Global Telecommunications Conference. Piscataway, NJ, USA, (Nov. 1, 2007), pp. 3504-3508, XP031196593, ISBN: 978-1-4244-1042-2.

Taiwan Search Report—TW098142534—TIPO—Dec. 19, 2012.

* cited by examiner

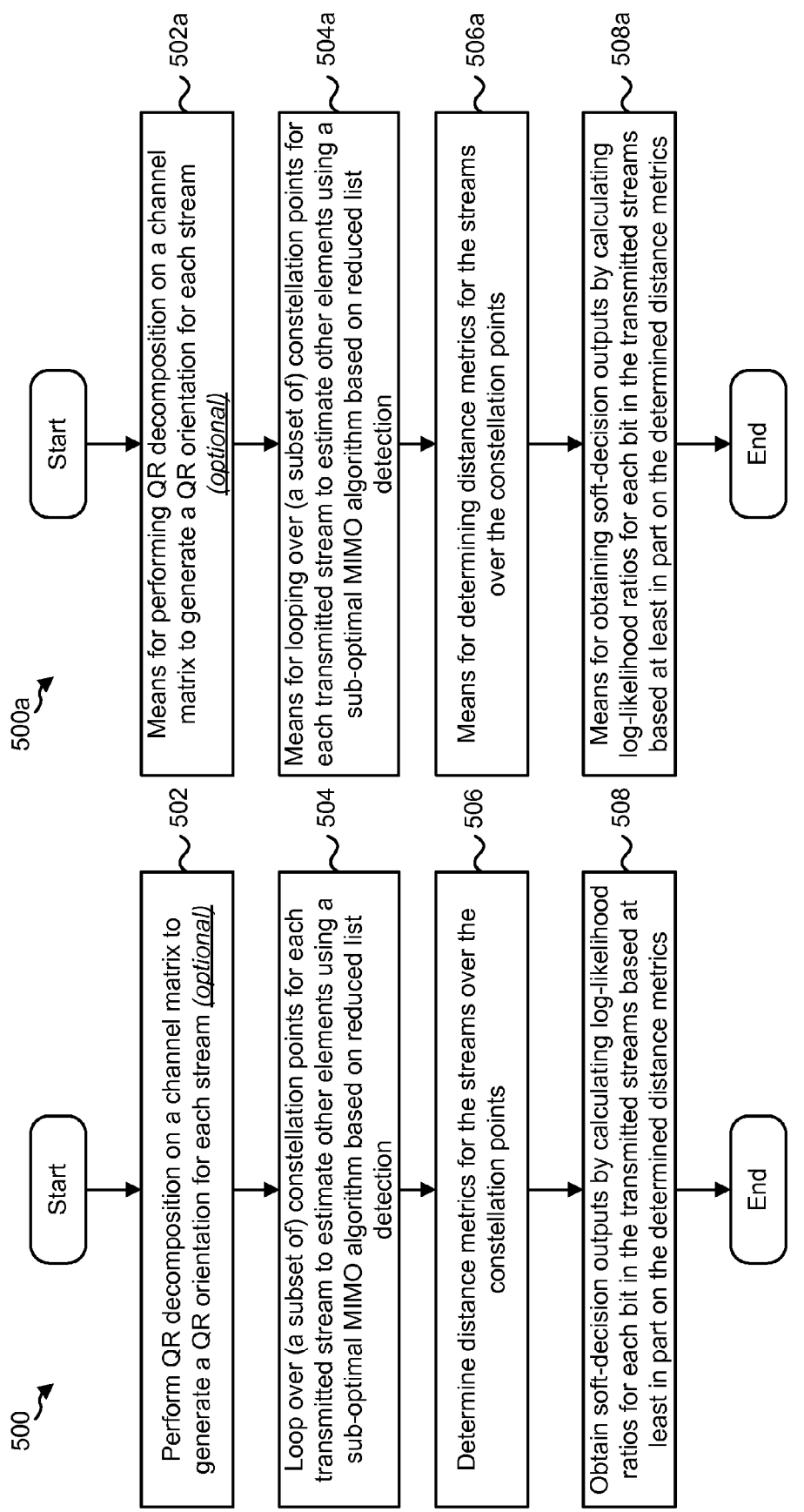

NEAR SOFT-OUTPUT MAXIMUM LIKELIHOOD DETECTION FOR MULTIPLE-INPUT MULTIPLE-OUTPUT SYSTEMS USING REDUCED LIST DETECTION

TECHNICAL FIELD

The present disclosure relates generally to wireless communications and more specifically to techniques for signal detection in a wireless communication system.

BACKGROUND

Wireless communication systems have become a prevalent means by which a majority of people worldwide have come to communicate. This is due in large part to the fact that recent advances in wireless communication technology have considerably improved the ability of such systems to carry data relating to voice, video, packet data, broadcast, messaging, and other services used in communication. In particular, multiple-input multiple-output (MIMO) communication systems are receiving increased attention due to their ability to improve the capacity of a wireless communication system through the use of multiple antennas for simultaneously transmitting or receiving data. Using a MIMO communication system, data may be divided into multiple streams, which may be sent or received simultaneously to improve system capacity without requiring significant additional spectrum or power.

In typical MIMO communication systems, data is transmitted by dividing the data into streams, grouping bits in each stream, mapping each group of bits to constellation points, and then transmitting the streams via multiple transmit antennas as modulated carrier waves based on the constellation points mapped for each stream. Once transmitted, the data passes through an effective MIMO channel, after which resulting spatial streams are received by multiple antennas at a receiver. Conventional MIMO receivers then employ a variety of signal detection techniques to obtain data from streams received at receive antennas. One such technique, Soft-Output Maximum-Likelihood Detection (SOMLD), may obtain the expected value of a detected transmitted bit as well as the likelihood that the expected value is correct. Conventional SOMLD techniques require looping over all constellation points used by the transmitter for each transmitted stream and determining a distance metric for each constellation point to find the likelihood of each bit in the streams. However, to determine optimal distance metrics in conventional SOMLD, additional looping is required over all constellation points for all other streams, effectively requiring looping over all possible combinations of constellation points for all streams. This procedure has exponential computational complexity, which makes it prohibitively costly for many applications, including applications that could benefit from soft-output detection. Thus, there exists a need in the art for low-complexity techniques that achieve Maximum-Likelihood-Detection (MLD) performance or near-MLD performance for hard-decision output detection or that achieve SOMLD performance or near-SOMLD performance for soft decision output signal detection in MIMO communication systems.

BRIEF DESCRIPTION OF THE DRAWINGS

FIG. 5 illustrates a method for near-SOMLD in a MIMO communication system using a Reduced-List Detection (RLD) algorithm;

FIG. 5A illustrates means-plus-function blocks corresponding to the method of FIG. 5;

DETAILED DESCRIPTION

Figure 1:
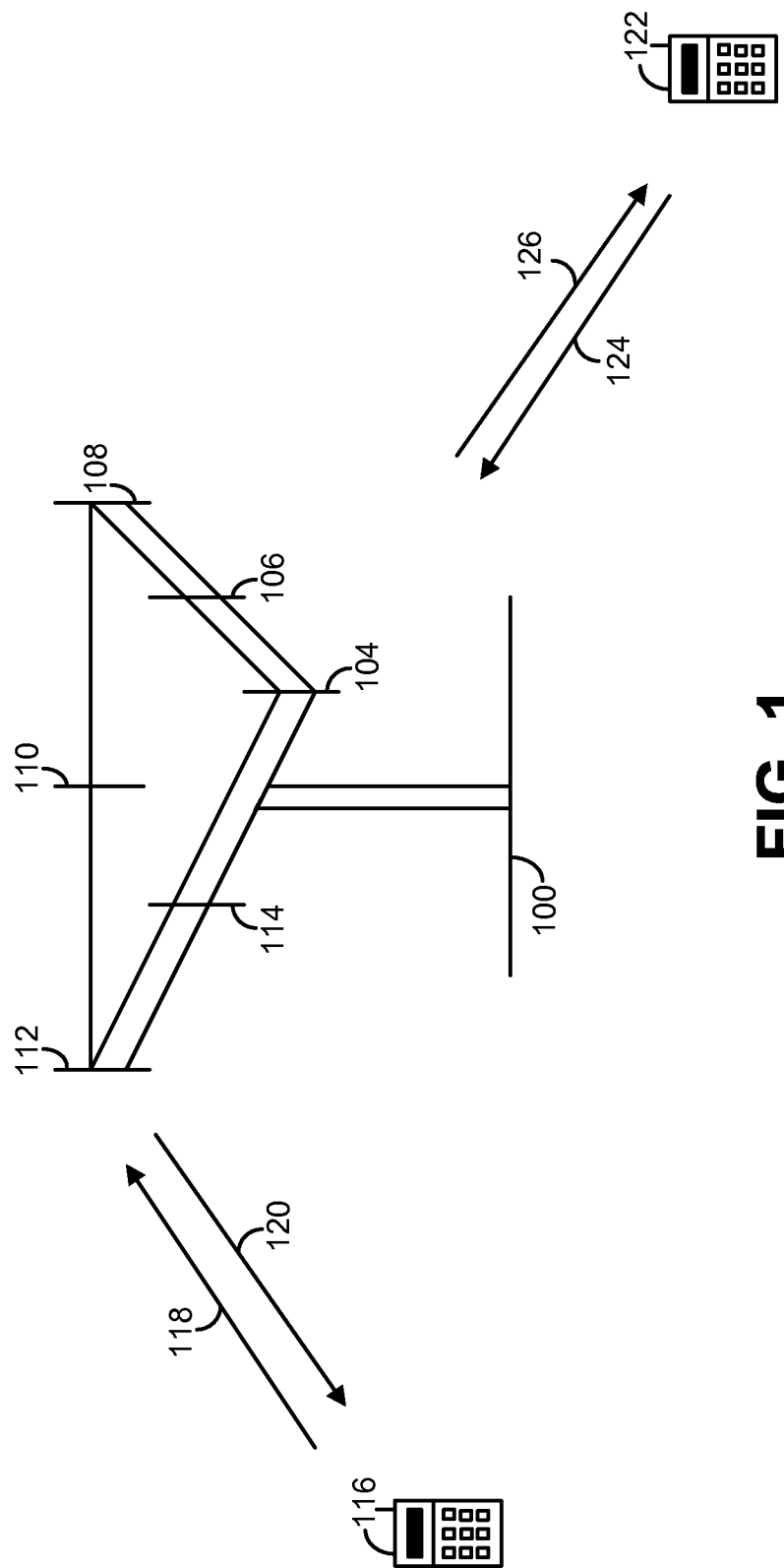
FIG. 1 is an illustration of a wireless multiple-access communication system in accordance with various aspects described herein.

A method for generating soft-decision output values for a set of transmitted spatial streams in a multiple-input multiple-output (MIMO) communication system is disclosed. A plurality of constellation points are looped over for respective transmitted spatial streams to estimate values for other transmitted streams based at least in part on Reduced List Detection (RLD). A set of distance metrics is determined as values of the plurality of constellation points for the respective transmitted spatial streams. Soft-decision outputs are generated for the respective transmitted streams based at least in part on the set of distance metrics.

Pre-processing may be performed and may be based on QR decomposition. The pre-processing may not be based on matrix decomposition, or the looping may further be based on a matrix decomposition algorithm other than QR decomposition. The generating may comprise calculating the approximated Log-Likelihood Ratio (LLR) using the distance metrics.

The plurality of constellation points may be a reduced square constellation around an estimate of the spatial stream being looped over. The reduced square constellation may include fewer constellation points than an original constellation to which the spatial stream is mapped.

The plurality of constellation points may be a reduced constellation in a form different than a reduced square constellation. The reduced square constellation may include fewer constellation points than an original constellation to which the spatial stream is mapped.

The plurality of constellation points may be assigned to a particular spatial stream based on the signal strength of the spatial stream, the noise level of the spatial stream, the Signal-to-Noise Ratio (SNR) of the spatial stream, or the capacity of the spatial stream.

The spatial streams may be sorted in ascending order based on signal strength and a spatial stream with the weakest signal strength may be looped over more constellation points than a spatial stream with a stronger signal strength. The signal strength of a spatial stream may be indicated by the absolute value of the $(N_t,N_t)$th element in the corresponding triangular matrix R produced in QR decomposition.

The determining of the set of distance metrics may use at least one or more of an approximated $l^1$-norm, an $l^1$-norm, an $l^2$-norm, a squared $l^2$-norm, and an $l^\infty$-norm. The respective transmitted spatial streams may be modulated using one or more of phase-shift keying (PSK), binary phase-shift keying (BPSK), quadrature phase-shift keying (QPSK), or quadrature amplitude modulation (QAM).

The set of transmitted spatial streams may be allocated among a plurality of subcarriers using orthogonal frequency division multiplexing (OFDM). The looping may include looping over a plurality of constellation points for respective transmitted spatial streams allocated to respective subcarriers. The determining of the set of distance metrics may include determining distance metrics for respective transmitted spatial streams allocated to respective subcarriers. The generating soft-decision outputs may include generating soft-decision outputs for respective transmitted streams allocated to respective subcarriers.

Enhanced Metric Usage (EMU) may be utilized. Initial distance metrics may be stored for a set of constellation points for the set of transmitted streams. Distance metrics may be determined as values of the plurality of constellation points for respective sets of transmitted spatial streams and corresponding estimated values for other transmitted streams. Distance metrics may be stored for respective sets of transmitted spatial streams and corresponding estimated values for other transmitted streams in place of higher stored distance metrics for the respective sets of transmitted spatial streams and corresponding estimated values for other transmitted streams. Soft-decision outputs may be generated for the respective transmitted streams based at least in part on the stored distance metrics.

The looping over the plurality of constellation points may include MIMO detection of at least part of the transmitted streams based on one or more of Zero Forcing (ZF), a Minimum Mean Square Error (MMSE) estimation, and Successive Interference Cancellation.

The set of distance metrics may include soft-decision input values respectively representing estimated values of the transmitted spatial streams. The soft outputs may also relate to the soft-decision input values.

An apparatus for generating soft-decision output values for a set of transmitted spatial streams in a multiple-input multiple-output (MIMO) communication system is disclosed. The apparatus includes a processor and memory in electronic communication with the processor. Executable instructions are stored in the memory. A plurality of constellation points are looped over for respective transmitted spatial streams to estimate values for other transmitted streams based at least in part on Reduced List Detection (RLD). A set of distance metrics is determined as values of the plurality of constellation points for the respective transmitted spatial streams. Soft-decision outputs are generated for the respective transmitted streams based at least in part on the set of distance metrics.

An apparatus for generating soft-decision output values for a set of transmitted spatial streams in a multiple-input multiple-output (MIMO) communication system is disclosed. The apparatus includes means for looping over a plurality of constellation points for respective transmitted spatial streams to estimate values for other transmitted streams based at least in part on Reduced List Detection (RLD). The apparatus includes means for determining a set of distance metrics as values of the plurality of constellation points for the respective transmitted spatial streams. The apparatus includes means for generating soft-decision outputs for the respective transmitted streams based at least in part on the set of distance metrics.

A computer-program product for generating soft-decision output values for a set of transmitted spatial streams in a multiple-input multiple-output (MIMO) communication system is disclosed. The computer-program product comprises a computer readable medium having instructions thereon. The instructions include code for looping over a plurality of constellation points for respective transmitted spatial streams to estimate values for other transmitted streams based at least in part on Reduced List Detection (RLD). The instructions include code for determining a set of distance metrics as values of the plurality of constellation points for the respective transmitted spatial streams. The instructions include code for generating soft-decision outputs for the respective transmitted streams based at least in part on the set of distance metrics.

FIG. 1 is an illustration of a wireless multiple-access communication system in accordance with various aspects described herein. In one example, an access point 100 (AP) may include multiple antenna groups. One antenna group may include antennas 104 and 106, another may include antennas 108 and 110, and another may include antennas 112 and 114. While only two antennas are shown for each antenna group, it should be appreciated that more or fewer antennas may be utilized for each antenna group. In another example, an access terminal 116 (AT) may be in communication with antennas 112 and 114, where antennas 112 and 114 transmit information to access terminal 116 over forward link 120 and receive information from access terminal 116 over reverse link 118. Additionally and/or alternatively, access terminal 122 may be in communication with antennas 104 and 106, where antennas 104 and 106 transmit information to access terminal 122 over forward link 126 and receive information from access terminal 122 over reverse link 124. In accordance with one aspect, access terminals 116 and 122 may have multiple antennas, with which multiple-input multiple-output (MIMO) communication may be established between access terminals 116 and 122 and access point 100 over respective forward links 120 and 126 and/or reverse links 118 and 124. Further, in a frequency division duplex (FDD) system, communication links 118, 120, 124 and 126 may use different frequencies for communication. For example, forward link 120 may use a different frequency than that used by reverse link 118.

Each group of antennas and/or the area in which they are designed to communicate may be referred to as a sector of the access point 100. In accordance with one aspect, antenna groups may be designed to communicate to access terminals in a sector of areas covered by access point 100. In communication over forward links 120 and 126, the transmitting antennas of access point 100 may utilize beamforming in order to improve the signal-to-noise ratio of forward links for the different access terminals 116 and 122. Also, an access point 100 using beamforming to transmit to access terminals scattered randomly through its coverage may cause less interference to access terminals in neighboring cells than an access point 100 transmitting through a single antenna to all its access terminals.

An access point 100 may be a fixed station used for communicating with terminals and may be referred to as a base station, a Node B, and/or other suitable terminology. In addition, an access terminal 116 122 may be referred to as a mobile terminal, user equipment (UE), a wireless communication device, a terminal, a wireless terminal, and/or other appropriate terminology.

Figure 2:
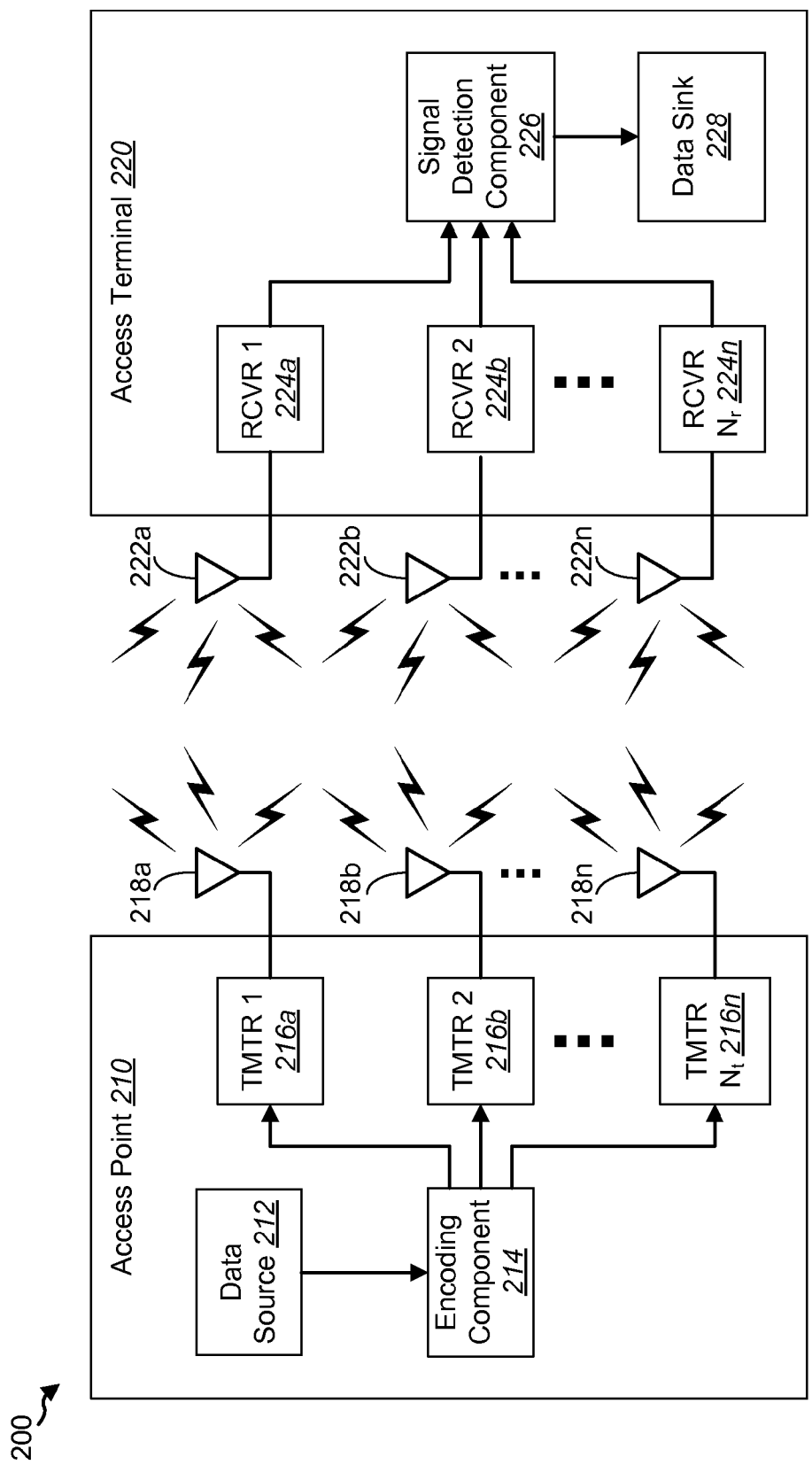
FIG. 2 is a block diagram of a multiple-input multiple-output (MIMO) wireless communication system that facilitates transmission and detection of spatial data streams in accordance with various aspects described herein.

FIG. 2 is a block diagram of a multiple-input multiple-output (MIMO) wireless communication system 200 that facilitates transmission and detection of spatial data streams in accordance with various aspects described herein. The system 200 may include an access point (AP) 210 capable of communicating with an access terminal (AT) 220. A system 200 may include any number of APs 210 and/or ATs 220. Further, while the following discussion generally relates to communication from the AP 210 to the AT 220 (e.g., communication over forward links 120 and 126), it should be appreciated that similar components and techniques could be employed by the AP 210 and/or the AT 220 for communication from the AT 220 to the AP 210 (e.g., communication over reverse links 118 and 124).

The AP 210 may include a data source 212 that may generate or otherwise obtain data for transmission to one or more ATs 220. Data from data source 212 may be sent to an encoding component 214 to process the data for communication to AT 220 via MIMO transmission. At encoding component 214, a series of bits comprising data to be transmitted to AT 220 may be grouped into spatial streams for simultaneous transmission by transmitters (TMTRs) 216 via antennas 218. Further, the encoding component 214 may modulate each spatial stream using one or more digital modulation techniques, such as phase-shift keying (PSK), binary phase-shift keying (BPSK), quadrature phase-shift keying (QPSK), 16-point quadrature amplitude modulation (16-QAM), 64-point quadrature amplitude modulation (64-QAM), and/or another suitable modulation technique, under which bits of data comprising each stream may be mapped to a series of modulation symbols based on a set of constellation points. Additionally and/or alternatively, orthogonal frequency division multiplexing (OFDM) may be utilized to divide a spatial stream among multiple orthogonal subcarriers such that each subcarrier may be individually modulated using one or more modulation techniques. Mapped modulation symbols for each stream may then be provided to respective transmitters 216 for communication to AT 220 as modulated analog signals via a series of $N_t$ antennas 218.

At an AT 220, spatial streams corresponding to signals transmitted by the AP 210 may be received by a series of $N_r$ receivers (RCVRs) 224 via respective antennas 222. In one example, an $N_r$-dimensional receive vector y corresponding to the streams received at an AT 220 may be expressed as follows:

$$y = Hx + n, \quad (1)$$

where H is an $N_r \times N_t$ matrix that represents the effective MIMO channel through which transmitted signals pass between an AP 210 and an AT 220, x is an $N_t$-dimensional transmit vector corresponding to the streams transmitted from an AP 210, and n is an $N_r$-dimensional vector that represents additive noise.

Receivers 224 may convey received spatial streams to a signal detection component 226, which may utilize the received streams and knowledge of the effective MIMO channel to obtain the streams transmitted by the AP 210. In accordance with one aspect, signal detection component 226 may determine hard-decision outputs for bits in spatial streams received from the AP 210 by determining the expected sign of each bit. For example, bits having a value of 1 may be represented by a hard-decision output of +1 while bits having a value of 0 may be represented by a hard-decision output of −1. Alternatively, signal detection component 226 may determine soft-decision outputs for bits in spatial streams received from the AP 210 by determining the expected sign of each bit in addition to the likelihood that the respective expected sign for each bit has been detected correctly, e.g., the likelihood that a bit was sent as +1 or −1. In accordance with another aspect, the signal detection component 226 may provide low-complexity soft-output detection by employing one or more near-Soft-Output Maximum Likelihood Detection (near-SOMLD) algorithms as described infra. After successful detection, the detected transmitted streams may be provided to a data sink 228 for use by the AT 220.

Figure 3:
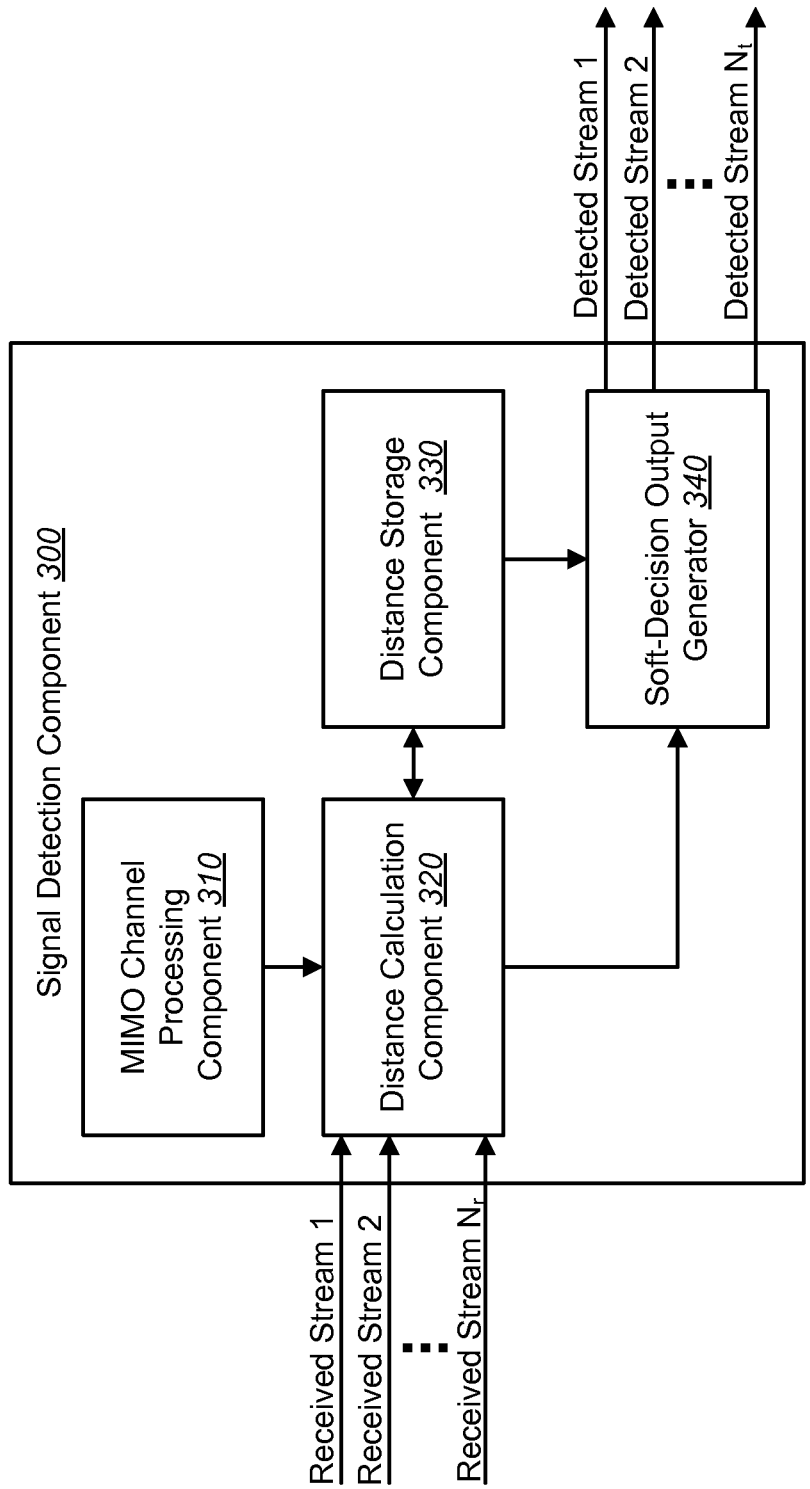
FIG. 3 is a block diagram illustrating an example of a signal detection component that may be utilized in a MIMO communication system in accordance with various aspects described herein.

FIG. 3 is a block diagram illustrating an example of a signal detection component 300 that may be utilized in a MIMO communication system in accordance with various aspects described herein. The signal detection component 300 may be used in MIMO systems employing IEEE 802.11n or a similar standard, Multi-User Detection applications, multi-mode fiber applications, and/or any other suitable communication systems or applications. Further, it should be appreciated that signal detection component 300 may be utilized by any appropriate network entity in a MIMO communication system, such as an access point (e.g., an AP 210), an access terminal (e.g., an AT 220), and/or any other suitable entity. In addition, a signal detection component 300 may be internal to an associated network entity or an external component that is communicatively connected to one or more associated network entities.

The signal detection component 300 may include a MIMO channel processing component 310 that may determine and/or store information relating to an effective MIMO channel through which spatial streams are transmitted to a network entity (e.g., an AP 210 and/or an AT 220). For example, a MIMO channel processing component 310 may represent channel information as a MIMO channel matrix, similar to the MIMO channel matrix H in Equation (1). MIMO channel processing component 310 may obtain the MIMO channel matrix through training based on, for example, preambles attached to one or more packets received at signal detection component 300; through one or more blind and/or semi-blind channel estimation techniques; and/or through other suitable techniques.

The MIMO channel processing component 310 may perform decomposition and/or other appropriate pre-processing techniques on a MIMO channel matrix prior to signal detection. It should be appreciated, however, that preprocessing need not be performed by the MIMO channel processing component 310 and that signal detection component 300 may perform signal detection using one or more techniques described infra with or without pre-processing by the MIMO channel processing component 310. The MIMO channel processing component 310 may pre-process a MIMO channel matrix by performing QR decomposition on the matrix. By utilizing QR decomposition, MIMO channel processing component 310 may represent a MIMO channel matrix H as a product of an orthogonal matrix Q and an upper triangular matrix R. After performing QR decomposition, the MIMO channel processing component 310 may communicate the decomposed channel matrix QR to one or more appropriate components either in place of or in addition to an unprocessed channel matrix H. Additionally, MIMO channel processing component 310 may monitor for changes to the effective MIMO channel and may adjust the channel matrix accordingly.

In accordance with another aspect, signal detection component 300 includes a distance calculation component 320. Distance calculation component 320 may obtain a series of received streams, which may be communicated by an array of receivers (e.g., receivers 224) and/or other suitable components or network entities. Alternatively, distance calculation component 320 and/or other sub-components in signal detection component 300 may receive soft-decision input values corresponding to a series of received streams, based on which signal detection component 300 may perform near soft-output maximum a posteriori probability (MAP) detection based on one or more of the signal detection algorithms described infra.

In one example, distance calculation component 320 may receive a series of spatial streams corresponding to a receive vector y as utilized in Equation (1). Based on the receive vector y and a MIMO channel matrix H received from MIMO channel processing component 310, distance calculation component 320 may determine distances between transmitted streams in a transmit vector x and all possible constellation point combinations used to modulate those streams (e.g., by an encoding component 214). These determined distances may then be used by a soft-decision output generator 340 to determine soft-decision outputs reflecting expected values of bits in the transmitted streams as well as their respective likelihoods. In accordance with one aspect, soft-decision outputs generated by soft-decision output generator 340 that correspond to detected streams may then be utilized by a decoder (not shown) that may utilize an "outer code" to further process the streams. An outer code utilized by the decoder may have error corrective ability that may, for example, introduce redundancy to improve the quality of wireless communication links to and/or from an entity employing signal detection component 300. Further, an outer code utilized by the decoder may be convolutional code, a low-density parity check (LDPC) code, and/or another appropriate type of code.

In another example, distance calculation component 320 may employ one or more near-Soft-Output Maximum Likelihood Detection (near-SOMLD) algorithms by looping over a set of constellation points used to modulate transmitted streams to determine distances between the transmitted streams and the constellation points. These distances may be determined, for example, by using a distance metric such as the approximated $l^1$-norm, the (non-approximated) $l^1$-norm, a squared $l^2$-norm, the $l^2$-norm, the $l^\infty$-norm, etc., or derivatives thereof. In conventional hard-decision MLD, calculating an optimal distance metric for each stream requires looping over all possible constellation points for all streams. Thus, in the specific example of $N_t$ transmitted streams respectively modulated using a constellation of size M, conventional MLD requires distance calculation for $M^{N_t}$ possible constellation point combinations. As a result, conventional MLD has exponential computational complexity with respect to the number of transmitted streams and is prohibitively complex for many applications. QR decomposition may be applied to conventional MLD to allow the final dimension of the required calculations to be obtained through slicing. However, such an algorithm retains exponential complexity as, for example, $M^{N_t-1}$ calculations are required where a constellation of size M is utilized to modulate $N_t$ transmitted streams. Similarly, QR-decomposed SOMLD requires looping over all $N_t$ transmitted streams such that each stream may be represented as the final dimension and found through slicing, resulting in a complexity order of $N_t M^{N_t-1}$.

In contrast, distance calculation component 320 may determine a reduced set of constellation points to be considered when calculating distance metrics for transmitted streams by using Reduced List Detection (RLD). This technique reduces the computational complexity of determining distance metrics for a spatial stream and will be discussed in further detail infra. RLD may be used alone or in conjunction with other techniques to reduce the computational complexity of determining distance metrics. Additionally, distance calculation component 320 may calculate distance metrics for transmitted streams over constellation points by utilizing techniques for estimating values used for calculation via one or more sub-optimal MIMO algorithms such as Per-Stream List Detection (PSLD), Lattice-Reduced Detection (LRD), the Guided-M algorithm, and/or other appropriate algorithms, such that looping over all possible, or even the entire reduced set of constellation points is not required.

As a result of using RLD and possibly other sub-optimal MIMO algorithms, distance calculation component 320 may significantly lower required complexity for soft-output detection while still providing close to optimal distance metrics. In an additional example, distance calculation component 320 may interact with a distance storage component 330 that may store calculated distance metrics to further improve distance calculation and usage by signal detection component 300. By way of specific example, distance storage component 330 may be used to provide Enhanced Metric Usage (EMU) as described infra.

In accordance with a further aspect, signal detection component 300 may include a soft-decision output generator 340 that may utilize distance metrics found for a series of transmitted streams to generate soft-decision outputs relating to the expected values and likelihoods of individual bits in the transmitted streams. In one example, the soft-decision output generator 340 may receive distance metrics relative to a set of constellation points for a stream $x_p$ in a transmit vector x from distance calculation component 320 and/or distance storage component 330. Based on these distance metrics, a soft-decision output value may be derived per bit that represents $x_p$ by, for example, using a Log-Likelihood Ratio (LLR). In one example, soft-decision output generator 340 may calculate an approximation of the LLR for a kth bit $b_k$ that represents $x_p$ as follows:

$$L(b_k) = \frac{1}{\sigma_n^2} \Big( \min_{x_p | b_k = 0} d_p(x_p) - \min_{x_p | b_k = 1} d_p(x_p) \Big), \quad (2)$$

where $d_p(x_p)$ is a distance metric received from the distance calculation component 320 and/or distance storage component 330 as a function of $x_p$ the minima are searched over all values (e.g., all possible constellation points) of $x_p$ for which $b_k=0$ and $b_k=1$, respectively. Further, $\sigma_n^2$ denotes the noise variance of additive noise n as utilized in Equation (1). Alternatively, it should be appreciated that the soft-decision output generator may utilize any other suitable soft-decision technique either in addition to or in place of the LLR calculation. Further, soft-decision outputs may further be quantized into a predetermined number of bits after calculation thereof. After the soft-decision outputs are generated, they may be provided as detected stream output from the signal detection component 300. Additionally and/or alternatively, the soft-decision output generator 340 may provide hard-decision outputs per bit in the transmitted streams by, for example, determining the sign of respective soft-decision outputs.

Figure 4:
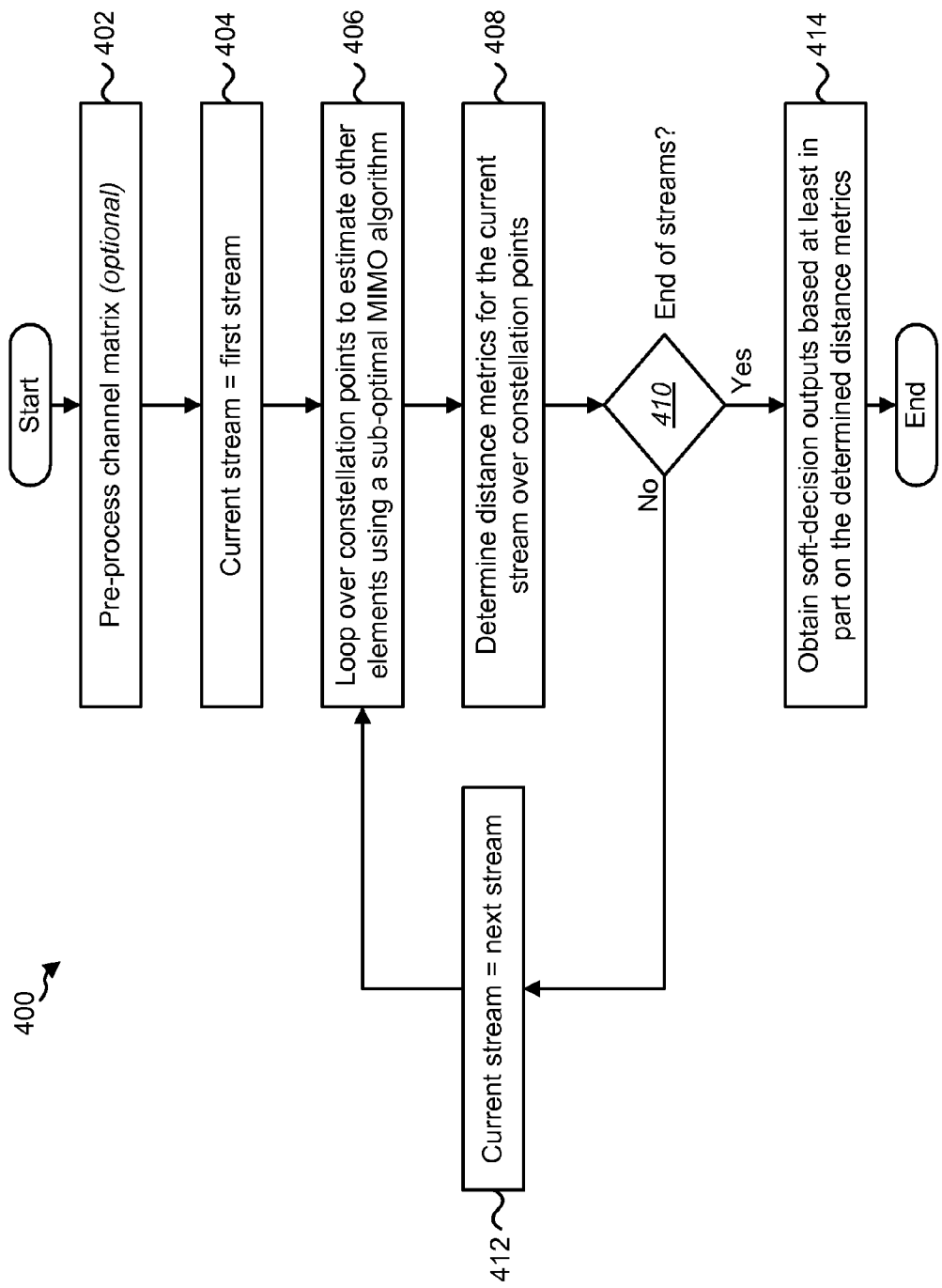
FIG. 4 illustrates a method for low complexity near-soft-output maximum likelihood detection (near-SOMLD) in a MIMO communication system.

FIG. 4 illustrates a method 400 for low complexity near-soft-output maximum likelihood detection (near-SOMLD) in a MIMO communication system (e.g., a communication system 200). Method 400 may be performed by a base station (e.g., an AP 210), a mobile terminal (e.g., an AT 220), and/or any other suitable entity in a wireless communication network. First, pre-processing 402 may be performed on a channel matrix (e.g., by a MIMO channel processing component 310 at a signal detection component 300) that represents the effective MIMO channel between a transmitting entity and a receiving entity in the MIMO system. This pre-processing may include QR decomposition, wherein a channel matrix H is decomposed into a product QR of a unitary or orthonormal matrix Q and an upper triangular matrix R. Alternatively, matrix Q may be an orthogonal matrix. It should be appreciated, however, that QR decomposition is only one example of pre-processing that may be performed and other pre-processing and/or matrix decomposition techniques may be performed in addition to or in place of QR decomposition. Further, it should be appreciated that the pre-processing at block 402 is optional and need not be performed in methodology 400. After the optional pre-processing 402, method 400 is initialized for a first transmitted stream at block 404.

Next, each stream may be looped 406 over a set of constellation points (e.g., by a distance calculation component 320) to estimate other elements using a sub-optimal MIMO algorithm. Elements estimated at block 406 may be, for example, other transmitted streams and/or any other elements necessary to compute distance metrics at block 408. In addition, the set of constellation points may represent a set of modulation symbols used by an entity in the MIMO system that transmitted the streams to be detected by methodology 400. As generally described supra, there are two ways to reduce the required looping: by reducing the set of constellation points over which the looping occurs by using RLD, and by estimating the other elements for each stream at block 406 for the set of constellation points. As a result, signal detection complexity may be greatly reduced while still allowing the calculation of close to optimal distance metrics and soft outputs. By way of specific, non-limiting example, sub-optimal MIMO algorithms that may be used at block 406 include Reduced-List Detection (RLD), Per-Stream List Detection (PSLD), Lattice-Reduced Detection (LRD), a Guided-M algorithm, Zero Forcing (ZF), a Minimum Mean Square Error (MMSE) algorithm, and/or another suitable algorithm.

After looping completes for each stream at block 406, distance metrics for the current stream may be determined 408 over the constellation points looped over in block 406 (e.g., by a distance calculation component 320 at a signal detection component 300). In one example, the distance metrics are obtained by using a channel matrix representing the effective MIMO channel over which the transmitted streams were received, which may or may not be pre-processed at block 402. Additionally, distance metrics at block 408 may be determined by using a distance metric such as the approximated $l^1$-norm, the (non-approximated) $l^1$-norm, the $l^2$-norm, a squared $l^2$-norm, the $l^1$-norm, and/or another suitable distance metric. Alternatively, while looping 406 over the constellation points and finding estimates of the constellation points on the other streams for every constellation point of the current stream, the distance metric for the resulting vector may be immediately determined 408, thus, combining steps 406 and 408. For example, if p is the current stream, $x_p$ is the current constellation point, $x_{1,est}, \ldots, x_{p-1,est}, x_{p+1,est}, \ldots, x_{Nt,est}$ are the estimated values on the other streams, and the squared $l^2$-norm is used for calculating the distance metric, then the distance metric may be calculated by equation 3 below (when not considering the QR-decomposition preprocessing yet):

$$d_p(x_p) = \left\| y - H \begin{pmatrix} x_{1,est} \\ \vdots \\ x_{p-1,est} \\ x_p \\ x_{p+1,est} \\ \vdots \\ x_{Nt,est} \end{pmatrix} \right\|^2_{l^2-norm} \quad (3)$$

After the distance metrics for the current stream are determined 408, a system 200 may determine 410 whether further transmitted streams are present. If further streams are present, the system 200 examines 412 the next transmitted stream and repeats blocks 406-410 for said stream. If no further transmitted streams are present, soft-decision outputs may be obtained 414 based on the distance metrics determined at block 408 for each stream (e.g., via a soft-decision output generator 340 at a signal detection component 300). Soft-decision outputs may be generated 414 by determining Log-Likelihood Ratios (LLRs) for each bit in the transmitted streams based on the calculated distance metrics. It should be appreciated, however, that other techniques for obtaining 414 soft-decision outputs may be utilized. In addition, it should be appreciated that hard-decision outputs may also be generated by, for example, determining the sign of respective soft-decision outputs. In another example, hard-decision outputs for a transmitted stream may be generated by performing reverse constellation mapping for a constellation point that minimizes a distance metric calculated at block 408 for the transmitted stream. Accordingly, a hard-decision output for a transmitted stream $x_3$ may be determined by searching for a minimum distance metric $d(x_3)$ calculated at block 408 and its corresponding value $x_3$. Based on the determined $x_3$ value, the reverse of the constellation mapping may be used to obtain the bits of the determined $x_3$ value and the bits of the values estimated for its corresponding $x_2$ and $x_1$ at block 406.

Figure 4A:
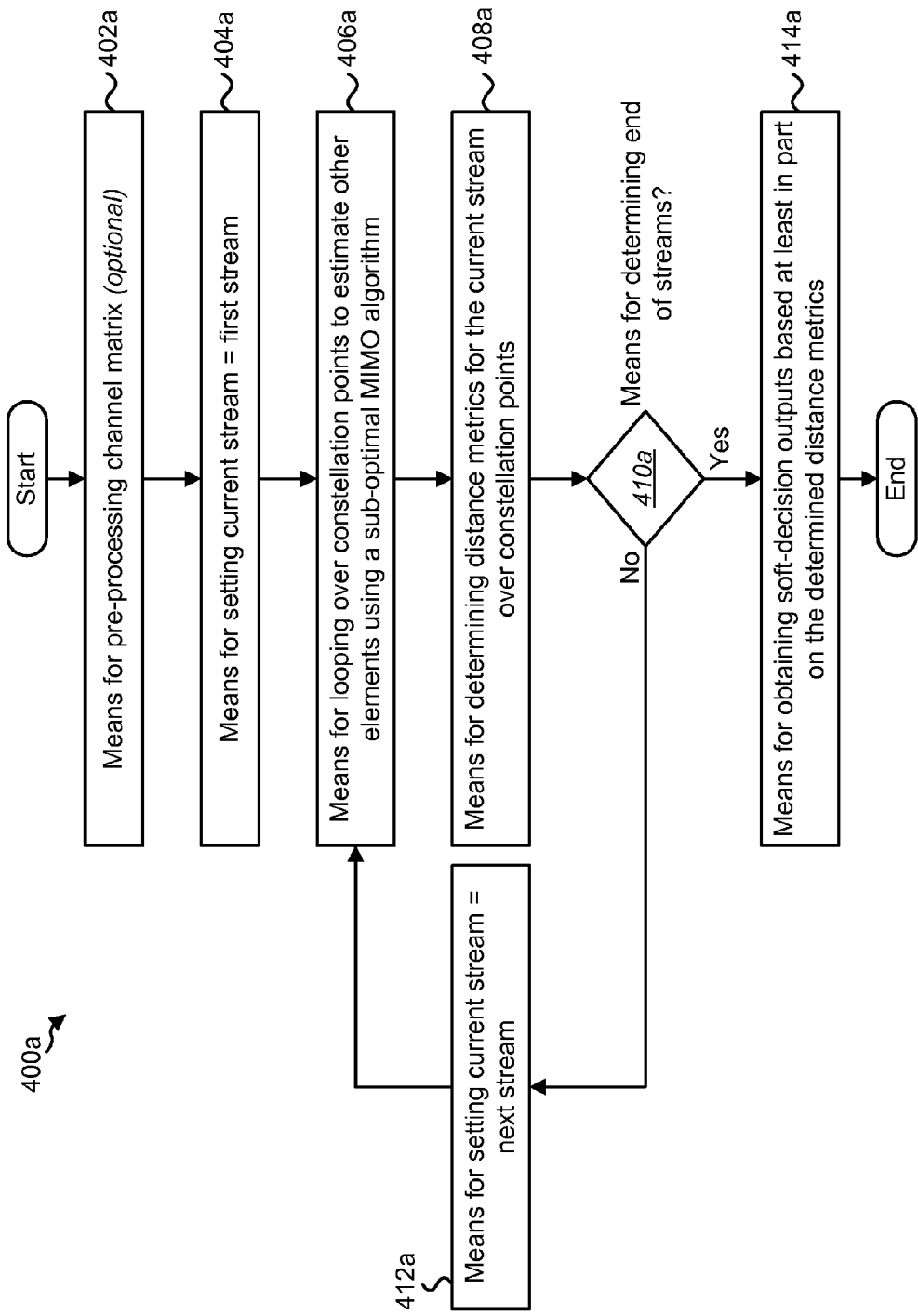
FIG. 4A illustrates means-plus-function blocks corresponding to the method of FIG. 4.

The method 400 of FIG. 4 described above may be performed by various hardware and/or software component(s) and/or module(s) corresponding to the means-plus-function blocks 400a illustrated in FIG. 4A. In other words, blocks 402 through 414 illustrated in FIG. 4 correspond to means-plus-function blocks 402a through 414a illustrated in FIG. 4A.

Figure 6:
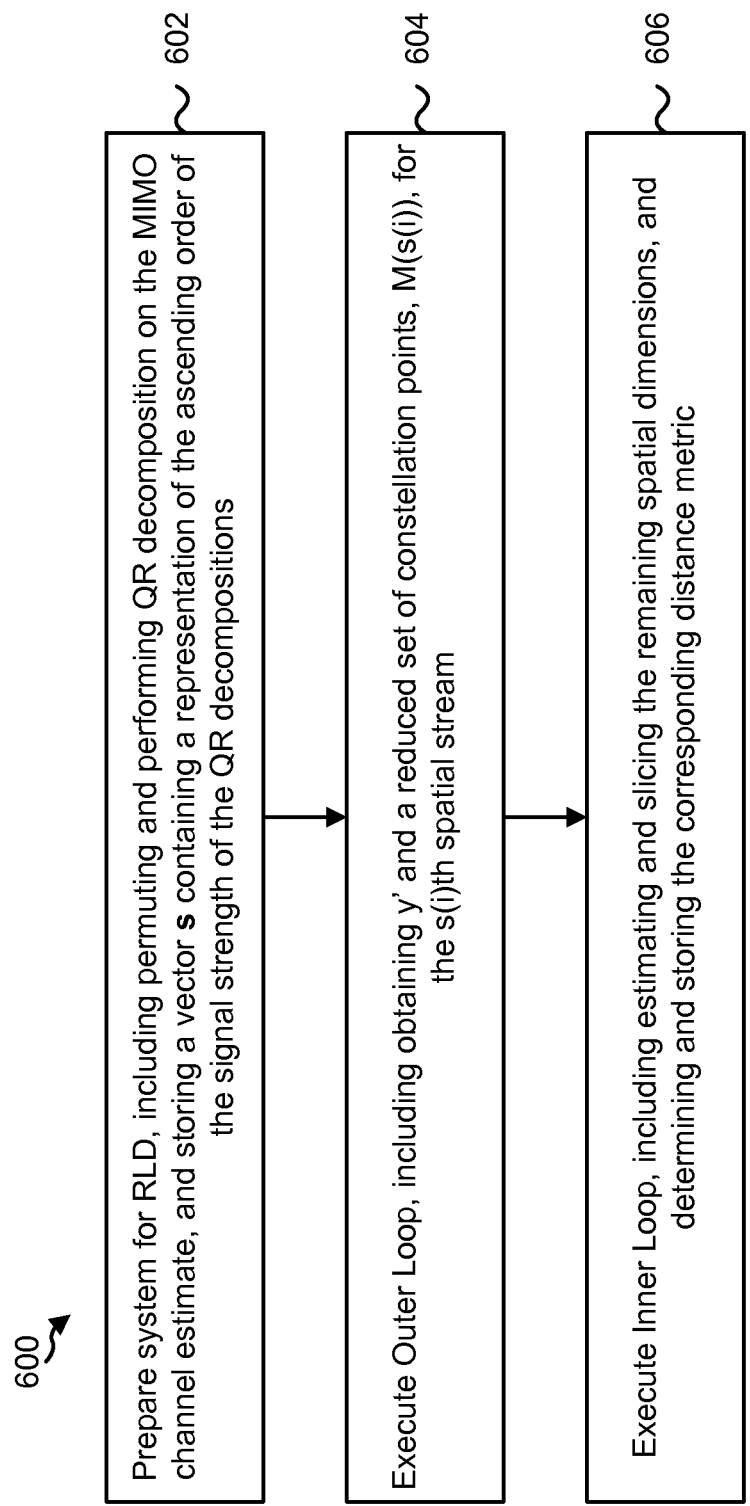
FIG. 6 again illustrates a method for near-SOMLD in a MIMO communication system using a Reduced-List Detection (RLD) algorithm, in more detail.
Figure 7:
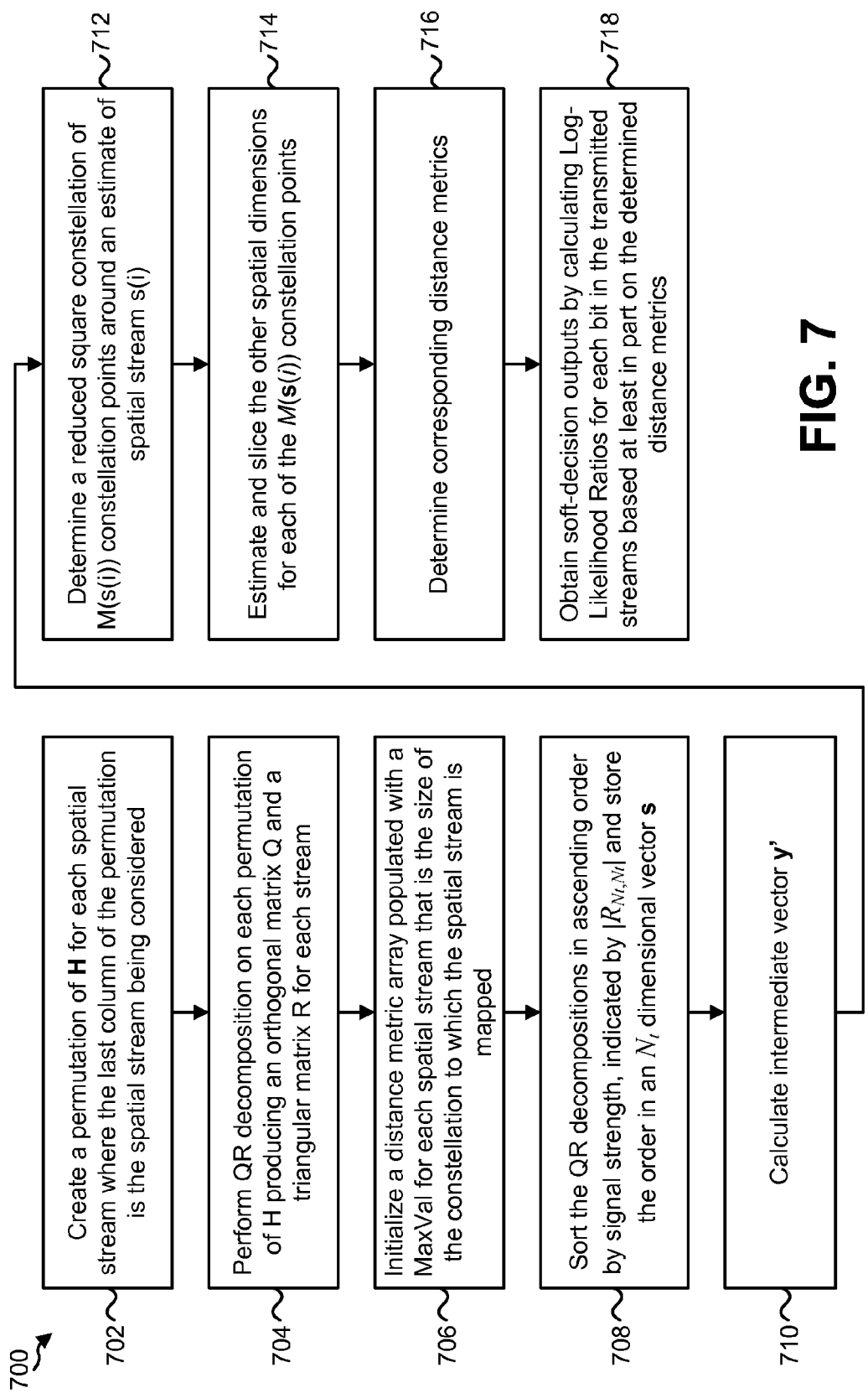
FIG. 7 illustrates the RLD algorithm in even more detail.

FIGS. 5-7 illustrate a method for near-SOMLD in a MIMO communication system 200 using a Reduced-List Detection (RLD) algorithm. Generally, the idea behind the generation of distance metrics in Reduced-List Detection (RLD) is to order the spatial streams in such a way that for a particular spatial stream, fewer constellation points need to be considered than for other spatial streams. Examples of ordering criteria may be the signal strength per spatial stream, the noise level per spatial stream, the Signal-to-Noise Ratio (SNR) per spatial stream, and the capacity per spatial stream. RLD may be performed by a base station, a mobile terminal, and/or any other suitable entity in a wireless communication network.

For the purpose of clarity, FIGS. 5-7 will illustrate the RLD algorithm in increasing complexity, e.g., FIG. 5 is the highest level illustration, FIG. 6 is more in-depth, and FIG. 7 is more in-depth still.

FIG. 5 illustrates a method 500 for near-SOMLD in a MIMO communication system 200 using a Reduced-List Detection (RLD) algorithm. Initially, QR decomposition may be performed 502. This may comprise QR decomposition on a channel matrix, such as H as described herein. However, this is not required and RLD may be performed without any QR decomposition. Next, a system 200 may loop 504 over a subset of constellation points for each transmitted stream to estimate other elements using a sub-optimal MIMO algorithm based on Reduced List Detection (RLD). The set of constellation points may be less than the size of the constellation. The other elements estimated may include intermediate vectors used later to determine 506 distance metrics for the streams over the constellation points. These distance metrics may then be used by the system 200 to obtain 508 soft-decision outputs for each bit in the transmitted stream. These outputs may be obtained 508 by calculating log-likelihood ratios for the bits in the streams.

The method 500 of FIG. 5 described above may be performed by various hardware and/or software component(s) and/or module(s) corresponding to the means-plus-function blocks 500a illustrated in FIG. 5A. In other words, blocks 502 through 508 illustrated in FIG. 5 correspond to means-plus-function blocks 502a through 508a illustrated in FIG. 5A.

FIG. 6 again illustrates a method 600 for near-SOMLD in a MIMO communication system 200 using a Reduced-List Detection (RLD) algorithm, in more detail. Specifically, FIG. 6 will describe "looping" 504 in RLD. From a high level, looping 504 comprises three stages: preparing 602 for RLD, outer looping 604 (i.e., looping over the spatial streams), and inner looping 606 (i.e., looping over (a subset of) constellation points per spatial stream). This may enable the system 200 to later determine distance metrics and obtain soft-decision outputs for transmitted streams.

First, the system 200 may perform 602 preparations for RLD. For all spatial streams i, $i \in \{1, \ldots, N_t\}$, the system may (1) permute the columns of the MIMO channel estimate such that the column that is representing the current spatial stream is the last and keep track of this permutation in the detected x values accordingly; and (2) perform the QR decomposition, producing matrices Q and R. The different permutations of the MIMO channel estimate will be referred to herein as "orientations". Additionally, the system 200 may sort the QR decompositions (in ascending order), e.g., by signal strength, by looking to the absolute value of the $R_{N_t,N_t}$'s (i.e., the $(N_t,N_t)$th element of the R's) of the different orientations. The system 200 may store the order in an $N_t$-dimensional vector s. Since, per orientation, the RLD algorithm starts the distance computations with the spatial stream that is permuted to be the last, spatial streams with a weak metric (in this case signal strength) should preferably be assigned more constellation points to start with than spatial streams with a strong metric.

Second, the system 200 may perform 604 an outer loop. The following steps may be performed for i is 1 to $N_t$, where s(i) is the ith element of s: (1) correct the received vector y for $Q_{s(i)}$ of the s(i)th orientation and obtain y'; (2) find a (non-sliced) estimate of spatial stream s(i) which was permuted to be the last for this orientation and take the M(s(i)) constellation points around it. Note that M(s(i)) may be a circle of points, a square of points, or any practical shape of points around the (non-sliced) estimate.

Third, the system 200 may perform 606 an inner loop. The following steps may be performed for all M(s(i)) constellation points: (1) estimate and slice the remaining spatial dimensions by some (sub-optimal) form of MIMO detection and determine the corresponding distance; (2) store this distance metric for the value of the potentially reduced set of constellation points, and for the estimated and sliced points of the other spatial dimensions. If a metric is already stored for a given point the system 200 may store the minimum of the two.

Examples of sub-optimal MIMO detection algorithms that may be used in the inner loop to estimate and slice the remaining spatial dimensions are Zero Forcing (ZF) and Minimum Mean Square Error (MMSE) estimation, potentially extended with Successive Interference Cancellation.

Figure 6A:
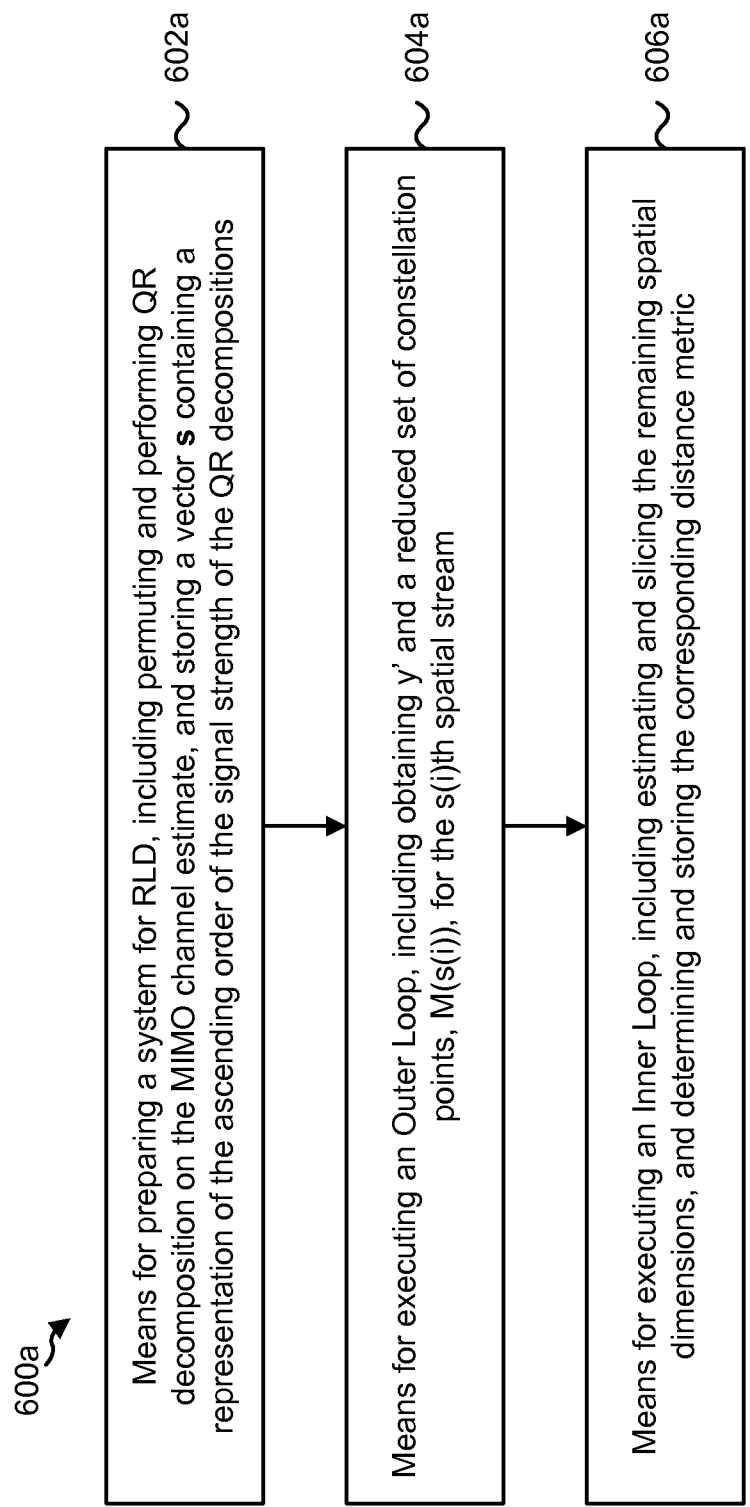
FIG. 6A illustrates means-plus-function blocks corresponding to the method of FIG. 6.

The method 600 of FIG. 6 described above may be performed by various hardware and/or software component(s) and/or module(s) corresponding to the means-plus-function blocks 600a illustrated in FIG. 6A. In other words, blocks 602 through 606 illustrated in FIG. 6 correspond to means-plus-function blocks 602a through 606a illustrated in FIG. 6A.

FIG. 7 illustrates the RLD algorithm in even more detail. This illustration is for $N_t=3$, but one skilled in the art may easily extend the algorithm to $N_t=4$, $N_t=5$, etc. Without loss of generality, ZF with Successive Interference Cancellation is used as sub-optimal MIMO algorithm. Further, in the following algorithm description the approximated $l^1$-norm is used, but also other norms may be used such as the (non-approximated) $l^1$-norm, the $l^2$-norm, a squared $l^2$-norm, the $l^\infty$-norm, etc., or derivatives thereof.

The first step may be to perform preparations for the RLD algorithm. Before the start of a payload, or every time (the estimate of) H is updated, three permutations of H, such that every column of H is permuted to be the last column only once are created 702 and QR decomposition performed 704 on them. This may result in three QR "orientations", $Q_1R_1$, $Q_2R_2$, $Q_3R_3$, where $Q_iR_i$ is assumed to be the QR decomposition of the permutation of H with the ith column of H permuted to be the last. Note that one skilled in the art may easily rewrite the RLD algorithm to not require the QR decomposition, or to use a non-QR matrix decomposition, but using QR decomposition as a preprocessing step may result in complexity reduction.

Note that in the description below it is assumed that for all spatial streams, the same constellation size is used for modulation, namely, a constellation size of M points. However, RLD may be extended to support an unequal constellation size per spatial stream.

Next, a system 200 may initialize 706 a distance metric array for every spatial stream to a high value, say MaxVal: $d_i = \text{MaxVal} * 1_{M \times 1}$, for $i \in \{1, \ldots, N_t\}$, where $1_{M \times 1}$ is an all-ones vector with M elements, where M is the size of the constellation, e.g., 64 elements for 64-QAM. In other words, for each received MIMO vector y, distance metric storage arrays may be initialized by setting distance metric storage arrays $d_1(x_1)$, $d_2(x_2)$, and $d_3(x_3)$ to a high value, such as a predetermined value MaxVal, for all $x_1$, $x_2$, and $x_3$ respectively. Note that although the search per spatial stream could potentially be over a reduced constellation point set, the full-size distance metric arrays may still be initialized to allow for updating the distance metrics for the estimated and sliced points of the remaining spatial streams in an "inner loop" discussed below. Because they are stored, the metrics found in a given spatial stream loop may be used to update those of the other spatial streams if they turn out to be better. In this way, reuse of distance metrics derived in other loops, e.g., using estimated $x_2$ values derived in the $x_3$ loop, may improve performance due to a kind of "distance-metric diversity".

Next, the system 200 may sort 708 the QR decompositions (in ascending order) according to the metric chosen, e.g., by signal strength, by looking to the absolute value of the $R_{Nt,Nt}$'s of the different orientations. The system 200 may then store the order of the QR decompositions in an $N_t$-dimensional vector s. Since, per orientation, the RLD algorithm starts the distance computations with the spatial stream that is permuted to be the last, spatial streams with a weak metric (in this case signal strength) should preferably be assigned more constellation points to start with than spatial streams with a strong metric.

The second step in the RLD algorithm may be to perform the outer loop. This loop may consider all elements of s in sequential order. This outer loop is described herein for s(i), which is assumed to equal 3. In one example, the estimation 504 for transmitted stream $x_3$ may proceed as follows.

Prior to looping over the constellation points, an intermediate vector y' may be determined 710 using the equation $y'=Q_{s(i)}(1:N_r,1:N_t)^H y$, where $Q_{s(i)}(1:N_r,1:N_t)$ represent the elements 1 to $N_r$ by 1 to $N_t$ of $Q_{s(i)}$. Further, a system 200 may determine $y'_3/(R_{s(i)})_{3,3}$, where $y'_3$ is the third element of y' and $(R_{s(i)})_{3,3}$ is the (3,3)th element of $R_{s(i)}$, and determine 712 the M(s(i)) points around it. Examples of how to determine 712 a reduced square constellation around $y'_3/(R_{s(i)})_{3,3}$ are given in the following paragraphs.

Without loss of generality, examples are given to determine 712 a reduced square constellation of M(s(i)) points from a 64-QAM constellation. The initial point to start with may be $u=y'_3/(R_{s(i)})_{3,3}$, with $u_{re}=\text{sqrt}(42)*\text{real}(u)$ and $u_{im}=\text{sqrt}(42)*\text{imag}(u)$. M(s(i)) may be a design parameter. For example, when a higher number of constellation points are considered in the inner loops, the performance of RLD may be better, but at the cost of a higher complexity. On the other hand, when a lower number of constellation points are considered in the inner loops, the performance may be worse, but the complexity lowers.

For M(s(i)) equals 49, the system 200 may list the 7×7 lower-left constellation points of the 64-QAM constellation, and call this TempRedConstel49. The system 200 may then determine the 49 points of the reduced constellation as follows:

$$RedConstel = TempRedConstel49 + \frac{2}{sqrt(42)}((u_{re} > 0) + j(u_{im} > 0)) \quad (4)$$

For M(s(i)) equals 36, the system 200 may list the 6×6 lower-left constellation points of the 64-QAM constellation, and call this TempRedConstel36. The system 200 may then determine the 36 points of the reduced constellation as follows:

$$RedConstel = TempRedConstel36 + \quad (5)$$
$$\frac{2}{sqrt(42)}((u_{re} > -1) + (u_{re} > 1) + j((u_{im} > -1) + (u_{im} > 1)))$$

For M(s(i)) equals 25, the system 200 may list the 5×5 lower-left constellation points of the 64-QAM constellation, and call this TempRedConstel25. The system may then determine the 25 points of the reduced constellation as follows:

$$RedConstel = \quad (6)$$
$$TempRedConstel25 + \frac{2}{sqrt(42)}((u_{re} > -2) + (u_{re} > 0) + (u_{re} > 2) +$$
$$j((u_{im} > -2) + (u_{im} > 0) + (u_{im} > 2)))$$

etc. for M(s(i)) equals 16, 9, 4, and 1.

Alternatively, instead of or in addition to a reduced square constellation, the system 200 may determine a reduced set of constellation points in another form. Examples of alternative forms may include a (roughly) round shape, a 45-degrees rotated square, a rectangle, or any other practical shape around the estimate of the spatial stream.

The third step in the RLD algorithm may be to perform the inner loop, where a distance metric may be determined for all M(s(i)) points in the (reduced) constellation of $x_3$ (remember that for purposes of illustration, we assume s(i) is equal to 3). From the intermediate vector y', the transmitted stream $x_3$ may be looped over the reduced square constellation of M(s(i)) points (determined in the outer loop) to determine a second intermediate vector y" for each possible value of $x_3$ in the M(s(i)) points. This may be done by calculating $y''=y'-R_{s(i)}(1:3,3)x_3$.

Based on the intermediate vectors y" determined for each constellation point in the reduced set, the system 200 may estimate 714 $x_2$ by using the equation $x_2=\text{Slice}(y''_2/r_{22})$, where $Y'_2$ is the second element of y", Slice( ) is a slicing operation to the nearest QAM constellation point, and $r_{22}$ is entry (2,2) of R. By finding $x_2$, the $l^1$-norm approximation of $y''_2-r_{22}x_2$, which is $|Re(y''_2-r_{22}x_2)|+|Im(y''_2-r_{22}x_2)|$ may be determined.

Based on this, the system 200 may calculate a third intermediate value $y'''_1$ using the equation $y'''_1=y''_1-r_{12}x_2$, and from this equation transmitted stream $x_1$ may be estimated 714 using the equation $x_1=\text{Slice}(y'''_1/r_{11})$. By finding $x_1$, the $l^1$-norm approximation of $y'''_1-r_{11}x_1$, which is $|Re(y'''_1-r_{11}x_1)|+|Im(y'''_1-r_{11}x_1)|$ may be determined.

Importantly, the system 200 may then determine 716 the distance metrics for the transmitted streams over the (reduced) set of constellation points. While the preceding blocks are illustrated as separate acts in the method 700, it should be appreciated that the acts described may be executed together. By way of specific, non-limiting example, distance metric calculation 716 may be performed as follows. First, for a transmitted stream $x_3$, a distance metric may be calculated for respective possible constellation points for transmitted stream $x_3$ using the approximated $l^1$-norm given by Equation (7) as follows:

$$dist = |Re(y'''_1 - r_{11}x_1)| + |Im(y'''_1 - r_{11}x_1)| + \quad (7)$$
$$|Re(y''_2 - r_{22}x_2)| + |Im(y''_2 - r_{22}x_2)| + |Re(y''_3)| + |Im(y''_3)|$$

Similar looping and distance metric calculation may then be performed for transmitted streams $x_2$ and $x_1$ to obtain distance metrics for each possible constellation point in the (reduced) set of constellation points of each transmitted stream.

After distance metrics for the transmitted streams are calculated, system 200 may obtain 718 soft-decision outputs by calculating log-likelihood ratios (LLRs) for each bit in the transmitted streams based at least in part on the distance metrics determined at step 716. By way of specific example, the soft-decision outputs may be determined, e.g., for the kth bit $b_k$ in $x_1$ using an approximation of the LLR expression given by Equation (8) as follows:

$$L(b_k) = \frac{1}{\sigma_n^2}\left(\min_{x_1|b_k=0} d_1(x_1) - \min_{x_1|b_k=1} d_1(x_1)\right) \quad (8)$$

Additionally, (approximated) LLRs for the other transmitted streams in x may be computed using similar expressions. Alternatively, a system 200 may use Enhanced Metric Usage (EMU) when determining distance metrics. This technique will be discussed infra.

Figure 7A:
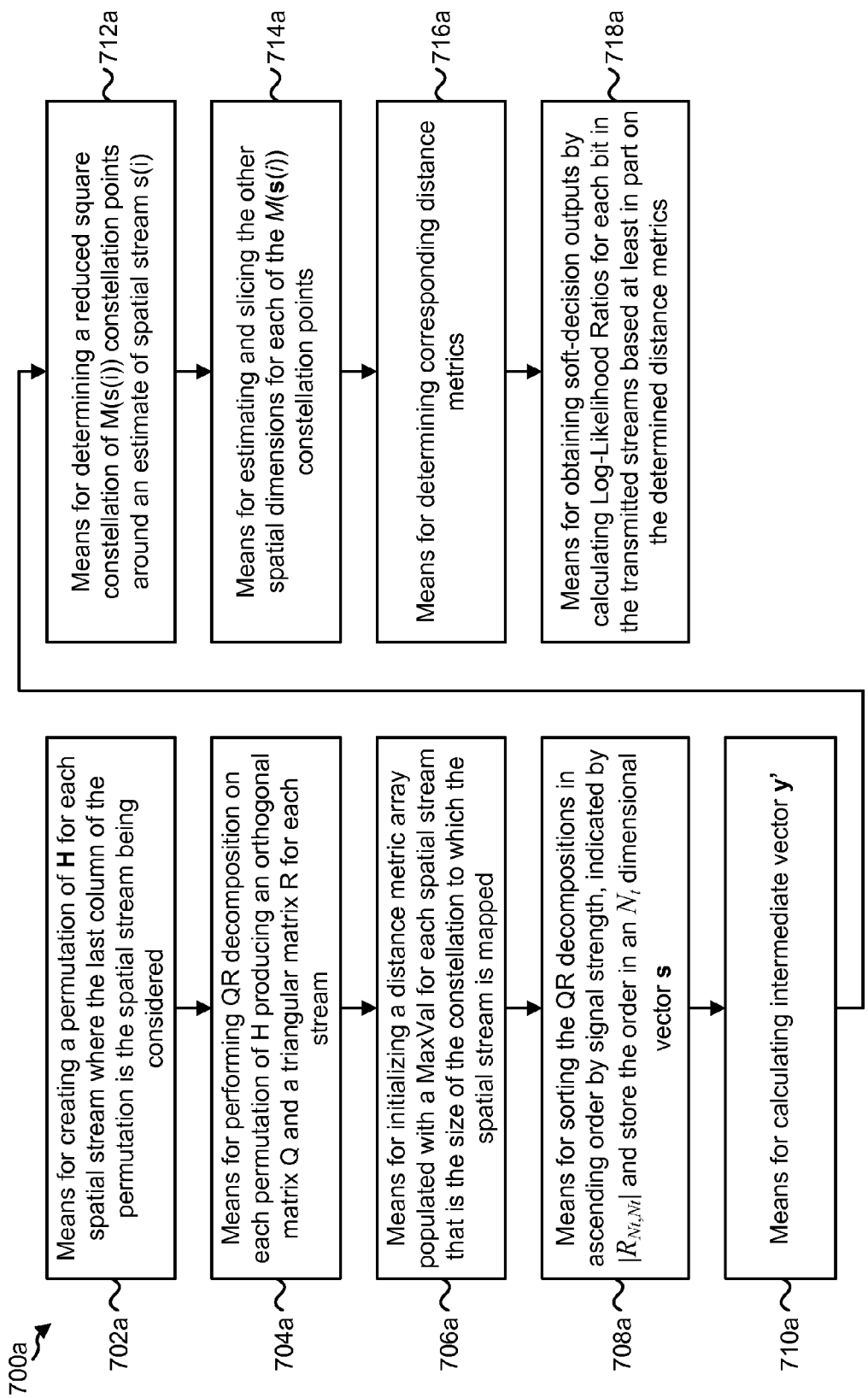
FIG. 7A illustrates means-plus-function blocks corresponding to the method of FIG. 7.

The method 700 of FIG. 7 described above may be performed by various hardware and/or software component(s) and/or module(s) corresponding to the means-plus-function blocks 700a illustrated in FIG. 7A. In other words, blocks 702 through 718 illustrated in FIG. 7 correspond to means-plus-function blocks 702a through 714a illustrated in FIG. 7A.

Figure 8:
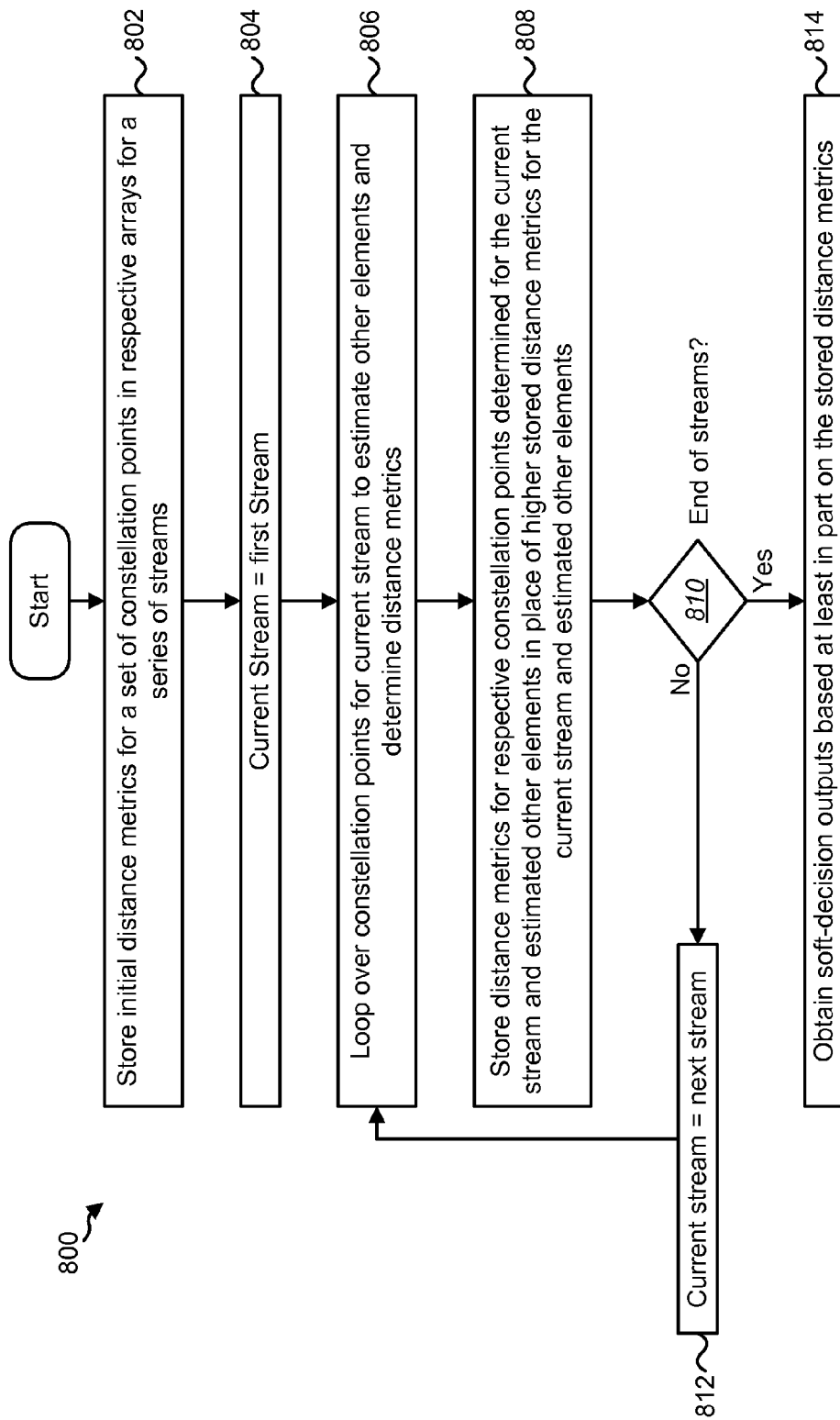
FIG. 8 illustrates an enhancement for low-complexity soft-output detection in a MIMO communication system with Enhanced Metric Usage (EMU)

FIG. 8 illustrates an enhancement for low-complexity soft-output detection in a MIMO communication system with Enhanced Metric Usage (EMU). This method 800 may be performed, for example, by an access point, an access terminal, and/or any other suitable entity in a wireless communication network. The method 800 is generally described for a series of 3 transmitted streams (e.g., from 3 transmit antennas 218 at an AP 210). It should be appreciated, however, that method 800 may be similarly applied for any number of transmitted streams. The general idea behind EMU is to make more effective use of calculated distance metrics. For example, it may be observed that distance metrics found for a given $x_3$ actually also apply to the estimated $x_1$ and $x_2$ for that $x_3$. It may happen that the distance metric for the corresponding $x_2$, when going through a loop for $x_2$, is not as good. This may occur, for example, when column 2 of the channel matrix H through which $x_2$ is received suffers from fading. Thus, by reusing the distance metrics derived in the $x_3$ loop for $x_2$ values estimated in the $x_3$ loop, a kind of distance metric diversity order may be achieved.

The following description generally relates to EMU used with RLD (e.g., a RLD algorithm implemented by the methodology 500 shown in FIG. 5). However, it should be appreciated that EMU may also be used with any suitable near-SOMLD algorithm. First, a distance metric array may be initialized 802 for every spatial stream to a high value, MaxVal: $d_i = \text{MaxVal} * 1_{M \times 1}$, for $i \in \{1, \ldots, N_t\}$, where $1_{M \times 1}$ is an all-ones vector with M elements, where M is the size of the constellation, e.g., 64 elements for 64-QAM. In other words, for each received MIMO vector y, distance metric storage arrays may be initialized by setting distance metric storage arrays $d_1(x_1)$, $d_2(x_2)$, and $d_3(x_3)$ to a high value, such as a predetermined value MaxVal, for all $x_1$, $x_2$, and $x_3$ respectively.

The method 800 may then be initialized 804 for a first transmitted stream, after which looping 806 may be performed. This looping 806 may be performed for a currently considered stream over a (reduced) set of constellation points to estimate other elements needed for distance calculation and to determine distance metrics for the respective estimated elements. This may be the same process described in blocks 702-716 in the method 700 of FIG. 7 and the associated description. Recall that the distance metric determined 706 in the method 700 of FIG. 7 was $$\text{dist} = |\text{Re}(y_1''' - r_{11}x_1)| + |\text{Im}(y_1''' - r_{11}x_1)| + \quad (9)$$
$$|\text{Re}(y_2'' - r_{22}x_2)| + |\text{Im}(y_2'' - r_{22}x_2)| + |\text{Re}(y_3'')| + |\text{Im}(y_3'')|$$

Once the distance metrics are determined 806, distance metrics for respective constellation points determined for the current stream and estimated other elements may be stored 808 in place of higher stored distance metrics for the current stream and estimated other elements. More particularly, for a given transmitted stream $x_3$ and corresponding estimated values for $x_1$ and $x_2$, the stored distance metrics may be updated as follows:

$$d_1(x_1) = \min(d_1(x_1), \text{dist})$$
$$d_2(x_2) = \min(d_2(x_2), \text{dist})$$
$$d_3(x_3) = \min(d_3(x_3), \text{dist}) \quad (10)$$

This principle is referred to herein as Enhanced Metric Usage (EMU). In other words, EMU includes checking the previously stored distance metrics and using the prior stored metric, e.g., $d_1(x_1)$, rather than the currently calculated metric, e.g., dist when the prior store metric is better. One of the purposes of EMU may be in the case where dist is found for a given $x_3$ and the correspondingly estimated $x_1$ and $x_2$, $d_3(x_3)$ is updated for the given $x_3$ according to Equation (10). Using EMU, $d_1(x_1)$ and $d_2(x_2)$ may also be updated for the estimated $x_1$ and $x_2$ according to Equation (10), respectively.

After the distance metrics for the current stream are determined 808, the system 200 may determine 810 whether further transmitted streams are present. If further streams are present, the method 800 may advance 812 to the next transmitted stream and repeat blocks 806-810 for that stream. If no further transmitted streams are present, soft-decision outputs based at least in part on the stored distance metrics may be obtained 814. By way of specific, non-limiting example, soft-decision outputs may be obtained 814 by calculating log-likelihood ratios (LLRs) for each bit in the transmitted streams. For example, an approximation of the LLRs can be determined, e.g., for the kth bit $b_k$ in $x_1$:

$$L(b_k) = \frac{1}{\sigma_n^2} \left( \min_{x_1 | b_k = 0} d_1(x_1) - \min_{x_1 | b_k = 1} d_1(x_1) \right) \quad (11)$$

Alternatively, the minimum searches $d_1(x_1) = \min(d_1(x_1), \text{dist})$, etc., may be combined with the above approximated LLR calculation. In such an example, minimum searches $d_1(x_1) = \min(d_1(x_1), \text{dist})$, etc., are not performed at block 808. Instead the distance metric dist may be stored in one big array d together with the given $x_3$, and the estimated $x_2$ and $x_1$. In this way, e.g., for 64-QAM, 64 times 3 (for the number of orientations)=192 distances are stored together with their corresponding $x_1$, $x_2$, and $x_3$. When this alternative way for EMU is used, an approximation of the LLRs can be found, e.g., for the kth bit $b_k$ in $x_1$, using:

$$L(b_k) = \frac{1}{\sigma_n^2} \left( \min_{x_1 | b_k = 0} d(x_1, x_2, x_3) - \min_{x_1 | b_k = 1} d(x_1, x_2, x_3) \right) \quad (12)$$

Figure 8A:
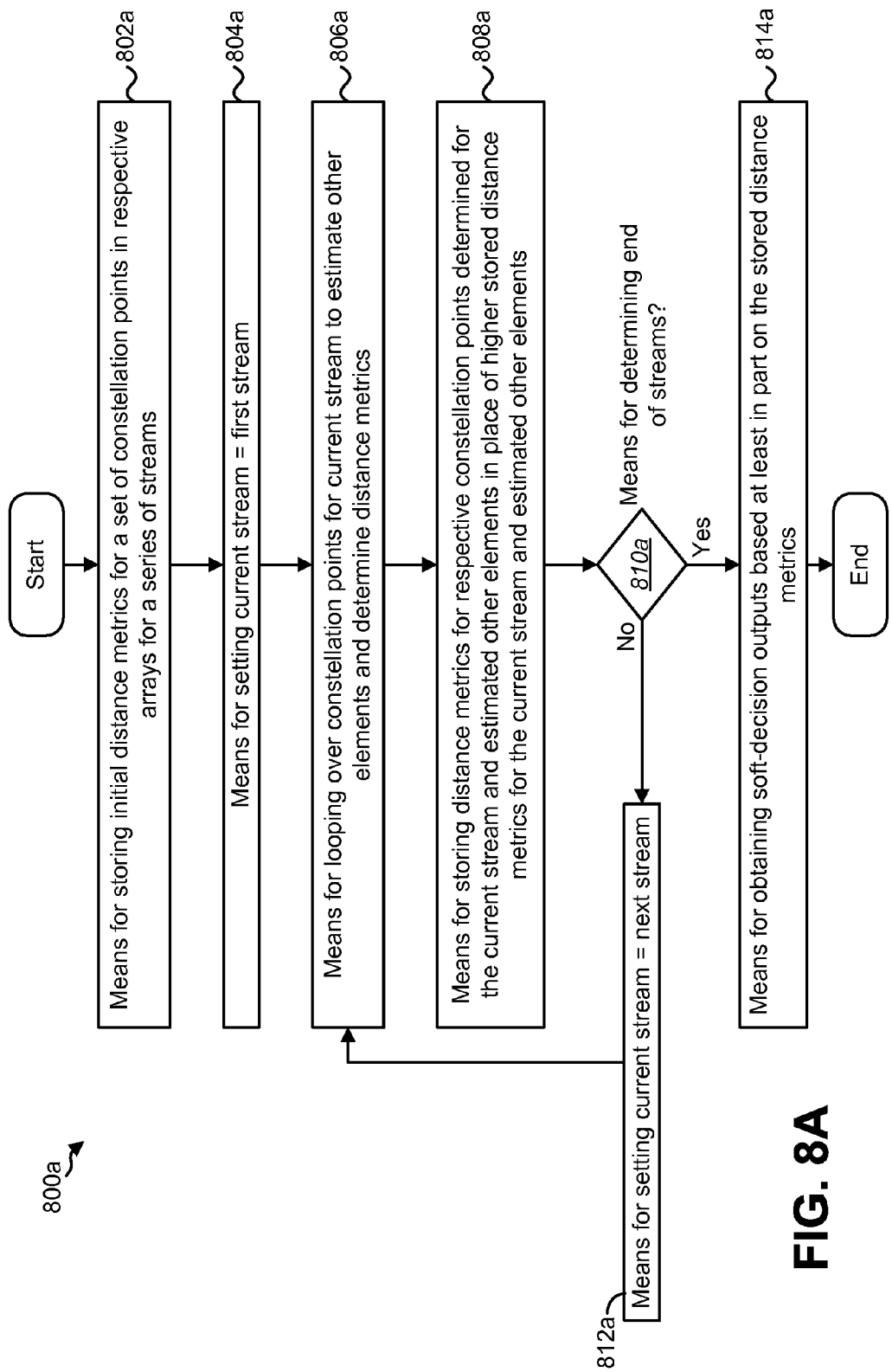
FIG. 8A illustrates means-plus-function blocks corresponding to the method of FIG. 8.

The method 800 of FIG. 8 described above may be performed by various hardware and/or software component(s) and/or module(s) corresponding to the means-plus-function blocks 800a illustrated in FIG. 8A. In other words, blocks 802 through 814 illustrated in FIG. 8 correspond to means-plus-function blocks 802a through 814a illustrated in FIG. 8A.

Figure 9:
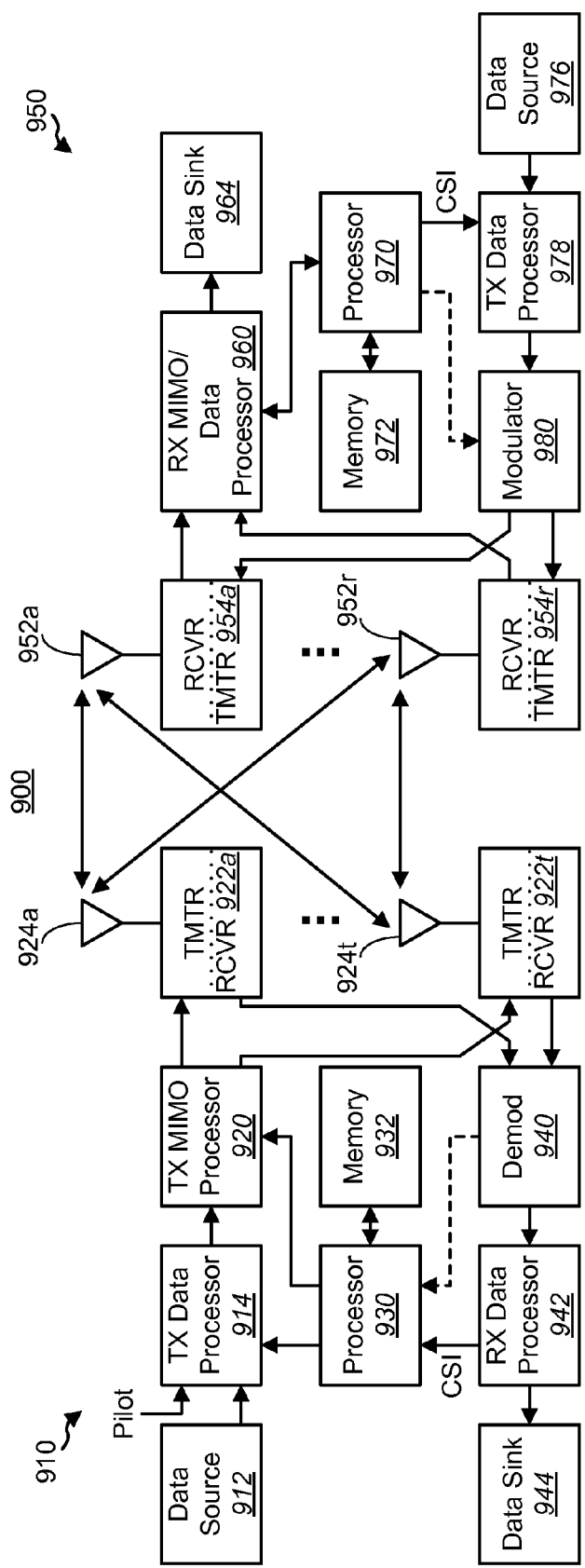
FIG. 9 is a block diagram illustrating an example wireless communication system in which one or more embodiments described herein may function.

FIG. 9 is a block diagram illustrating an example wireless communication system 900 in which one or more embodiments described herein may function. In one example, system 900 is a multiple-input multiple-output (MIMO) system that includes a transmitter system 910 and a receiver system 950. It should be appreciated, however, that transmitter system 910 and/or receiver system 950 could also be applied to a multi-input single-output system wherein, for example, multiple transmit antennas (e.g., on a base station), may transmit one or more symbol streams to a single antenna device (e.g., a mobile station). Additionally, it should be appreciated that aspects of transmitter system 910 and/or receiver system 950 described herein may be utilized in connection with a single output to single input antenna system.

In accordance with one aspect, traffic data for a number of data streams are provided at transmitter system 910 from a data source 912 to a transmit (TX) data processor 914. In one example, each data stream may then be transmitted via a respective transmit antenna 924. Additionally, TX data processor 914 may format, code, and interleave traffic data for each data stream based on a particular coding scheme selected for each respective data stream in order to provide coded data. In one example, the coded data for each data stream may then be multiplexed with pilot data using OFDM techniques. The pilot data may be, for example, a known data pattern that is processed in a known manner. Further, the pilot data may be used at receiver system 950 to estimate a channel response. Back at transmitter system 910, the multiplexed pilot and coded data for each data stream may be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream may be determined by instructions performed on and/or provided by processor 930.

Next, modulation symbols for all data streams may be provided to a TX MIMO processor 920, which may further process the modulation symbols (e.g., for OFDM). TX MIMO processor 920 may then provide $N_t$ modulation symbol streams to $N_t$ transmitters (TMTR) 922a through 922t. In one example, each transmitter 922 is capable of receiving and processing a respective symbol stream to provide one or more analog signals. Each transmitter 922 may then further condition (e.g., amplify, filter, and upconvert) the analog signals to provide a modulated signal suitable for transmission over a MIMO channel. Accordingly, $N_t$ modulated signals from transmitters 922a through 922t may then be transmitted from $N_t$ antennas 924a through 924t, respectively.

In accordance with another aspect, the transmitted modulated signals may be received at receiver system 950 by $N_r$ antennas 952a through 952r. The received signal from each antenna 952 may then be provided to a respective receiver (RCVR) 954. In one example, each receiver 954 may condition (e.g., filter, amplify, and downconvert) a respective received signal, digitize the conditioned signal to provide samples, and then process the samples to provide a corresponding "received" symbol stream. An RX MIMO/data processor 960 may then receive and process the $N_r$ received symbol streams from $N_r$ receivers 954 based on a particular receiver processing technique to provide $N_t$ "detected" symbol streams. In one example, each detected symbol stream may include symbols that are estimates of the modulation symbols transmitted for the corresponding data stream. RX MIMO/data processor 960 may then process each symbol stream at least in part by demodulating, deinterleaving, and decoding each detected symbol stream to recover traffic data for a corresponding data stream. After successful recovery, the stream may be provided to a data sink 964. Thus, the processing by RX MIMO/data processor 960 may be complementary to that performed by TX MIMO processor 920 and TX data processor 914 at transmitter system 910.

In another example, RX MIMO/data processor 960 may be limited in the number of subcarriers that it may simultaneously demodulate. For example, RX MIMO/data processor 960 may be limited to 512 subcarriers at 5 MHz, 128 subcarriers at 1.25 MHz, or 256 subcarriers at 2.5 MHz. In another example, RX MIMO/data processor 960 may be limited to 128 subcarriers at 40 MHz or 64 subcarriers at 20 MHz. Further, the channel response estimate generated by RX MIMO/data processor 960 may be used to perform space/time processing at the receiver, adjust power levels, change modulation rates or schemes, and/or other appropriate actions. Additionally, RX MIMO/data processor 960 may further estimate channel characteristics such as, for example, signal-to-noise-and-interference ratios (SNRs) of the detected symbol streams. RX MIMO/data processor 960 may then provide estimated channel characteristics to a processor 970. In one example, RX MIMO/data processor 960 and/or processor 970 may further derive an estimate of the "operating" SNR for the system. Processor 970 may then provide channel state information (CSI), which may comprise information regarding the communication link and/or the received data stream. This information may include, for example, the operating SNR. The CSI may then be processed by a TX data processor 978 (which may be coupled to a data source 976), modulated by a modulator 980, conditioned by transmitters 954a through 954r, and transmitted back to transmitter system 910.

Back at transmitter system 910, the modulated signals from receiver system 950 may then be received by antennas 924, conditioned by receivers 922, demodulated by a demodulator 940, and processed by a RX data processor 942 to recover the CSI reported by receiver system 950. After successful recovery, the stream may be provided to a data sink 944. In one example, the reported CSI may then be provided to processor 930 and used to determine data rates as well as coding and modulation schemes to be used for one or more data streams. The determined coding and modulation schemes may then be provided to transmitters 922 for quantization and/or use in later transmissions to receiver system 950. Additionally and/or alternatively, the reported CSI may be used by processor 930 to generate various controls for TX data processor 914 and TX MIMO processor 920.

In one example, processor 930 at transmitter system 910 and processor 970 at receiver system 950 direct operation at their respective systems. Additionally, memory 932 at transmitter system 910 and memory 972 at receiver system 950 may provide storage for program codes and data used by processors 930 and 970, respectively. Further, at receiver system 950, various processing techniques may be used to process the $N_r$ received signals to detect the $N_t$ transmitted symbol streams. In one example, these processing techniques may include one or more of methods 400, 500, 600, 700, 800, and/or any other appropriate technique for near-SOMLD. Additionally and/or alternatively, processing techniques utilized by receiver system 950 may include spatial and space-time receiver processing techniques, which may also be referred to as equalization techniques, and/or "successive nulling/equalization and interference cancellation" receiver processing techniques, which may also be referred to as "successive interference cancellation" or "successive cancellation" receiver processing techniques.

Figure 10:
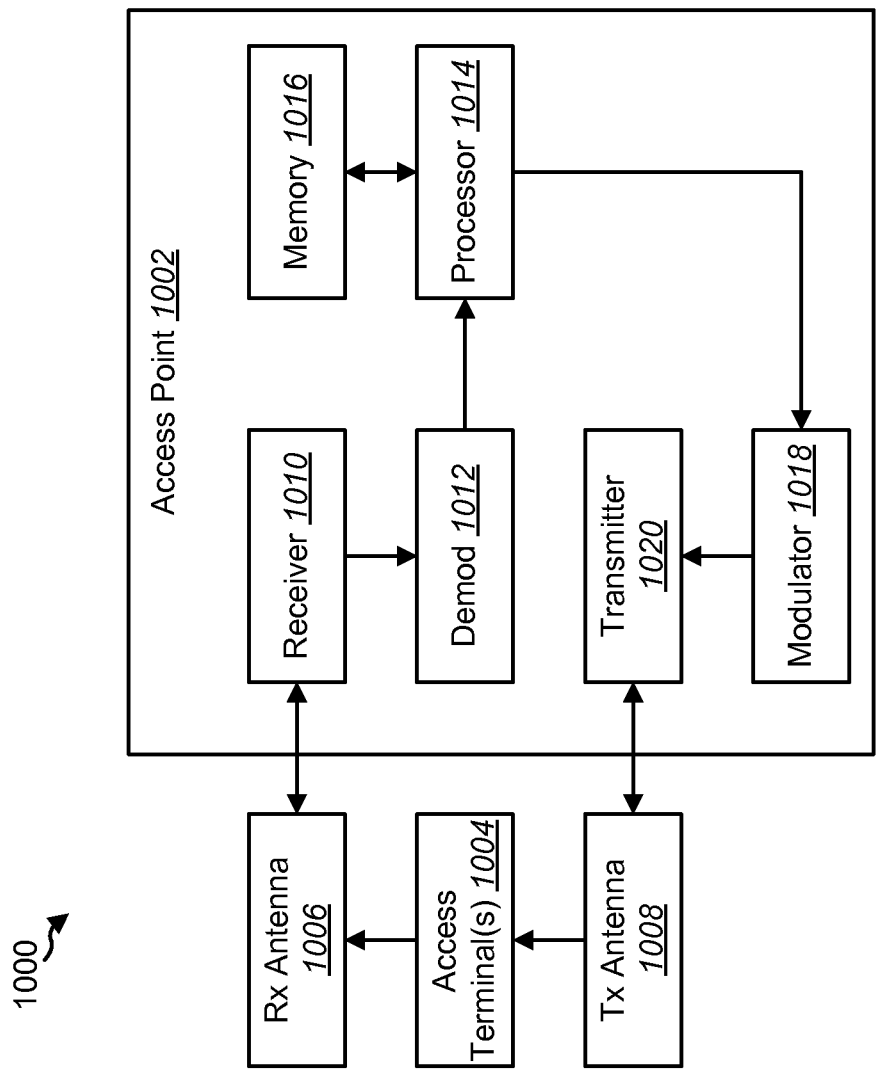
FIG. 10 is a block diagram of a system that coordinates modulation and transmission of spatial data streams in accordance with various aspects described herein.

FIG. 10 is a block diagram of a system 1000 that coordinates modulation and transmission of spatial data streams in accordance with various aspects described herein. In one example, system 1000 includes a base station or access point 1002. As illustrated, access point 1002 may receive signal(s) from one or more access terminals 1004 via a receive (Rx) antenna 1006 and transmit to the one or more access terminals 1004 via a transmit (Tx) antenna 1008.

Additionally, access point 1002 may comprise a receiver 1010 that receives information from receive antenna 1006. In one example, the receiver 1010 may be operatively associated with a demodulator (Demod) 1012 that demodulates received information. Demodulated symbols may then be analyzed by a processor 1014. Processor 1014 may be coupled to memory 1016, which may store information related to code clusters, access terminal assignments, lookup tables related thereto, unique scrambling sequences, and/or other suitable types of information. In one example, access point 1002 may employ demodulator 1012 and/or processor 1014 to perform methods 400, 500, 600, 700, 800, and/or other similar and appropriate methods. Access point 1002 may also include a modulator 1018 that is capable of multiplexing a signal for transmission by a transmitter 1020 through transmit antenna 1008 to one or more access terminals 1004.

Figure 11:
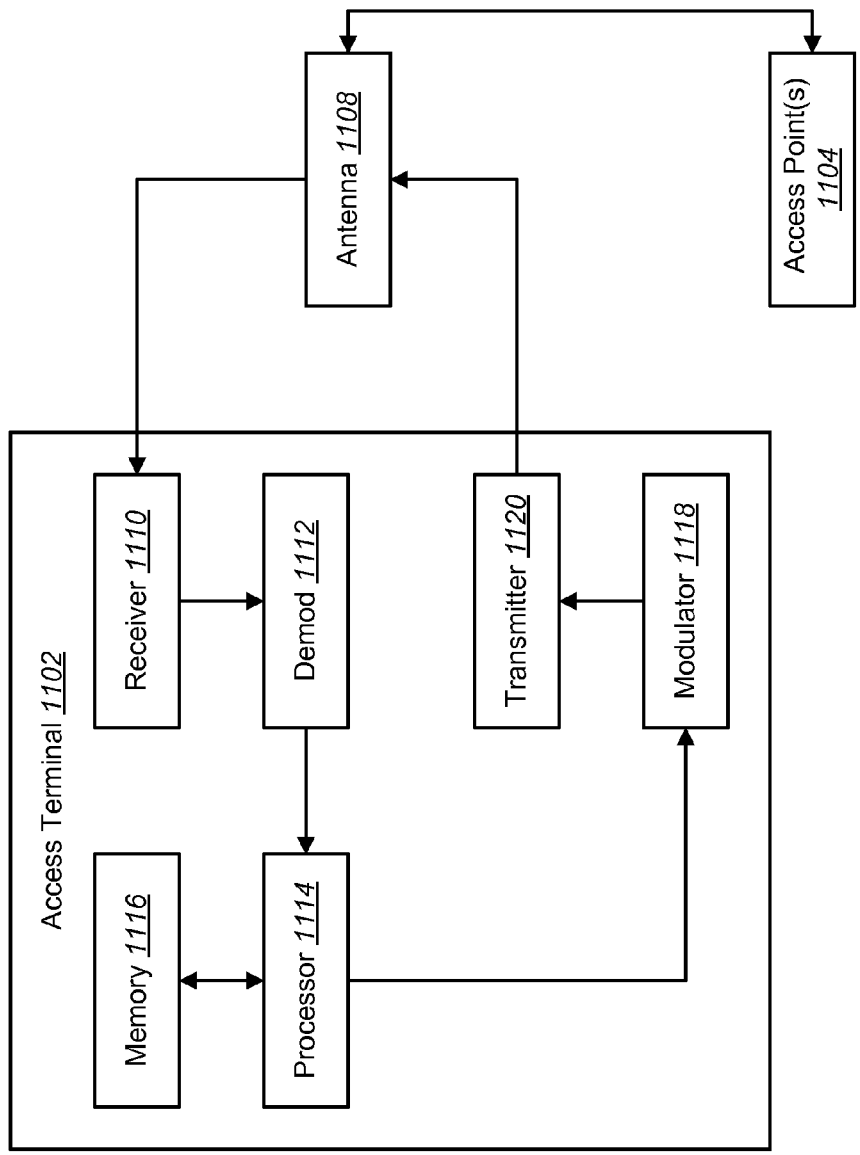
FIG. 11 is a block diagram of a system that coordinates reception and detection of spatial data streams in accordance with various aspects described herein.

FIG. 11 is a block diagram of a system 1100 that coordinates reception and detection of spatial data streams in accordance with various aspects described herein. In one example, system 1100 includes an access terminal 1102. As illustrated, access terminal 1102 may receive signal(s) from one or more access points 1104 and transmit to the one or more access points 1104 via an antenna 1108. Additionally, access terminal 1102 may comprise a receiver 1110 that receives information from antenna 1108. In one example, receiver 1110 may be operatively associated with a demodulator (Demod) 1112 that demodulates received information. Demodulated symbols may then be analyzed by a processor 1114. Processor 1114 may be coupled to memory 1116, which may store data and/or program codes related to access terminal 1102. Additionally, access terminal 1102 may employ demodulator 1112 and/or processor 1114 to perform methods 400, 500, 600, 700, 800, and/or other similar and appropriate methodologies. Access terminal 1102 may also include a modulator 1118 that is capable of multiplexing a signal for transmission by a transmitter 1120 through antenna 1108 to one or more access points 1104.

By way of general notes, in the described algorithms, the LLR is used to generate soft-decision output values, but other soft-decision metrics may also be used. Additionally, the described algorithms all generate soft-decision output values, the methods and configurations contained herein may be modified to use the hard-decision equivalents of the described algorithms may be envisioned. A very simple approach to generate hard-decision equivalents from the described algorithms might be to take the sign of the LLR output values. One skilled in the art may easily find more efficient ways to derive hard-decision equivalents from the described algorithms.

On the other hand, it may also be possible to extend the described algorithms to accept soft-decision input values, resulting in (near) Soft-Output Maximum A posteriori Probability (MAP) detectors.

Finally, note that if the channel is expected to change during the course of the transmission, it may be desirable to regularly update the channel estimate H and the corresponding QR decompositions.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art, which may be referred to as a computer-readable medium, a computer-program product or a processor-readable medium. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 4-8, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for generating soft-decision output values for a set of transmitted spatial streams in a multiple-input multiple-output (MIMO) communication system, comprising:
    looping over a plurality of constellation points for respective transmitted spatial streams to estimate values for other transmitted streams based at least in part on Reduced List Detection (RLD);
    determining a set of distance metrics as values of the plurality of constellation points for the respective transmitted spatial streams; and
    generating soft-decision outputs for the respective transmitted streams based at least in part on the set of distance metrics,
    wherein the plurality of constellation points are assigned to a particular spatial stream based on the signal strength of the spatial stream, the noise level of the spatial stream, the Signal-to-Noise Ratio (SNR) of the spatial stream, or the capacity of the spatial stream, and
    wherein the spatial streams are sorted in ascending order based on signal strength and a spatial stream with the weakest signal strength is looped over more constellation points than a spatial stream with a stronger signal strength, wherein the signal strength of a spatial stream is indicated by the absolute value of the $(N_r, N_t)$th element in the corresponding triangular matrix R produced in QR decomposition.

2. The method of claim 1, further comprising pre-processing based on QR decomposition.

3. The method of claim 2, wherein the pre-processing is not based on matrix decomposition, or the looping is further based on a matrix decomposition algorithm other than QR decomposition.

4. The method of claim 1, wherein the generating comprises calculating the approximated Log-Likelihood Ratio (LLR) using the distance metrics.

5. The method of claim 1, wherein the plurality of constellation points is a reduced square constellation around an estimate of the spatial stream being looped over, wherein the reduced square constellation comprises fewer constellation points than an original constellation to which the spatial stream is mapped.

6. The method of claim 1, wherein the plurality of constellation points is a reduced constellation in a form different than a reduced square constellation, wherein the reduced square constellation comprises fewer constellation points than an original constellation to which the spatial stream is mapped.

7. The method of claim 1, wherein the determining uses at least one or more of an approximated $l^1$-norm, an $l^1$-norm, an $l^2$-norm, a squared $l^2$-norm, and an $l^\infty$-norm.

8. The method of claim 1, wherein the respective transmitted spatial streams are modulated using one or more of phase-shift keying (PSK), binary phase-shift keying (BPSK), quadrature phase-shift keying (QPSK), or quadrature amplitude modulation (QAM).

9. The method of claim 1, wherein the set of transmitted spatial streams are allocated among a plurality of subcarriers using orthogonal frequency division multiplexing (OFDM), wherein:
    the looping includes looping over a plurality of constellation points for respective transmitted spatial streams allocated to respective subcarriers,
    the determining the set of distance metrics includes determining distance metrics for respective transmitted spatial streams allocated to respective subcarriers, and
    the generating soft-decision outputs includes generating soft-decision outputs for respective transmitted streams allocated to respective subcarriers.

10. The method of claim 1, wherein the looping over the plurality of constellation points includes MIMO detection of at least part of the transmitted streams based on one or more of Zero Forcing (ZF), a Minimum Mean Square Error (MMSE) estimation, and Successive Interference Cancellation.

11. The method of claim 1, wherein the set of distance metrics comprises soft-decision input values respectively representing estimated values of the transmitted spatial streams, wherein the soft outputs also relate to the soft-decision input values.

12. A method for generating soft-decision output values for a set of transmitted spatial streams in a multiple-input multiple-output (MIMO) communication system, comprising:
    looping over a plurality of constellation points for respective transmitted spatial streams to estimate values for other transmitted streams based at least in part on Reduced List Detection (RLD);
    determining a set of distance metrics as values of the plurality of constellation points for the respective transmitted spatial streams; and
generating soft-decision outputs for the respective transmitted streams based at least in part on the set of distance metrics
    further utilizing Enhanced Metric Usage (EMU), wherein the determining further comprises:
    storing initial distance metrics for a set of constellation points for the set of transmitted streams;
    determining distance metrics as values of the plurality of constellation points for respective sets of transmitted spatial streams and corresponding estimated values for other transmitted streams;
    storing distance metrics for respective sets of transmitted spatial streams and corresponding estimated values for other transmitted streams in place of higher stored distance metrics for the respective sets of transmitted spatial streams and corresponding estimated values for other transmitted streams; and
    generating soft-decision outputs for the respective transmitted streams based at least in part on the stored distance metrics.

13. An apparatus for generating soft-decision output values for a set of transmitted spatial streams in a multiple-input multiple-output (MIMO) communication system, comprising:
    a processor;
    memory in electronic communication with the processor;
    instructions stored in the memory, the instructions being executable by the processor to:
        loop over a plurality of constellation points for respective transmitted spatial streams to estimate values for other transmitted streams based at least in part on Reduced List Detection (RLD);
        determine a set of distance metrics as values of the plurality of constellation points for the respective transmitted spatial streams; and
        generate soft-decision outputs for the respective transmitted streams based at least in part on the set of distance metrics, wherein the plurality of constellation points are assigned to a particular spatial stream based on the signal strength of the spatial stream, the noise level of the spatial stream, the Signal-to-Noise Ratio (SNR) of the spatial stream, or the capacity of the spatial stream, and wherein the spatial streams are sorted in ascending order based on signal strength and a spatial stream with the weakest signal strength is looped over more constellation points than a spatial stream with a stronger signal strength, wherein the signal strength of a spatial stream is indicated by the absolute value of the ($N_t$, $N_t$)th element in the corresponding triangular matrix R produced in QR decomposition.

14. The apparatus of claim 13, wherein the instructions are further executable to pre-process based on QR decomposition.

15. The apparatus of claim 14, wherein the pre-processing is not based on matrix decomposition, or the looping is further based on a matrix decomposition algorithm other than QR decomposition.

16. The apparatus of claim 13, wherein the generating comprises calculating the approximated Log-Likelihood Ratio (LLR) using the distance metrics.

17. The apparatus of claim 13, wherein the plurality of constellation points is a reduced square constellation around an estimate of the spatial stream being looped over, wherein the reduced square constellation comprises fewer constellation points than an original constellation to which the spatial stream is mapped.

18. The apparatus of claim 13, wherein the plurality of constellation points is a reduced constellation in a form different than a reduced square constellation, wherein the reduced square constellation comprises fewer constellation points than an original constellation to which the spatial stream is mapped.

19. The apparatus of claim 13, wherein the determining uses at least one or more of an approximated $l^1$-norm, an $l^1$-norm, an $l^2$-norm, a squared $l^2$-norm, and an $l^\infty$-norm.

20. The apparatus of claim 13, wherein the respective transmitted spatial streams are modulated using one or more of phase-shift keying (PSK), binary phase-shift keying (BPSK), quadrature phase-shift keying (QPSK), or quadrature amplitude modulation (QAM).

21. The apparatus of claim 13, wherein the set of transmitted spatial streams are allocated among a plurality of subcarriers using orthogonal frequency division multiplexing (OFDM), wherein:
the looping includes looping over a plurality of constellation points for respective transmitted spatial streams allocated to respective subcarriers,
the determining the set of distance metrics includes determining distance metrics for respective transmitted spatial streams allocated to respective subcarriers, and
the generating soft-decision outputs includes generating soft-decision outputs for respective transmitted streams allocated to respective subcarriers.

22. The apparatus of claim 13, wherein the looping over the plurality of constellation points includes MIMO detection of at least part of the transmitted streams based on one or more of Zero Forcing (ZF), a Minimum Mean Square Error (MMSE) estimation, and Successive Interference Cancellation.

23. The apparatus of claim 13, wherein the set of distance metrics comprises soft-decision input values respectively representing estimated values of the transmitted spatial streams, wherein the soft outputs also relate to the soft-decision input values.

24. An apparatus for generating soft-decision output values for a set of transmitted spatial streams in a multiple-input multiple-output (MIMO) communication system, comprising:
a processor;
memory in electronic communication with the processor;
instructions stored in the memory, the instructions being executable by the processor to:
loop over a plurality of constellation points for respective transmitted spatial streams to estimate values for other transmitted streams based at least in part on Reduced List Detection (RLD);
determine a set of distance metrics as values of the plurality of constellation points for the respective transmitted spatial streams; and
generate soft-decision outputs for the respective transmitted streams based at least in part on the set of distance metrics,
further utilizing Enhanced Metric Usage (EMU), wherein the determining further comprises:
storing initial distance metrics for a set of constellation points for the set of transmitted streams;
determining distance metrics as values of the plurality of constellation points for respective sets of transmitted spatial streams and corresponding estimated values for other transmitted streams;
storing distance metrics for respective sets of transmitted spatial streams and corresponding estimated values for other transmitted streams in place of higher stored distance metrics for the respective sets of transmitted spatial streams and corresponding estimated values for other transmitted streams; and
generating soft-decision outputs for the respective transmitted streams based at least in part on the stored distance metrics.

25. An apparatus for generating soft-decision output values for a set of transmitted spatial streams in a multiple-input multiple-output (MIMO) communication system, comprising:
means for looping over a plurality of constellation points for respective transmitted spatial streams to estimate values for other transmitted streams based at least in part on Reduced List Detection (RLD);
means for determining a set of distance metrics as values of the plurality of constellation points for the respective transmitted spatial streams; and
means for generating soft-decision outputs for the respective transmitted streams based at least in part on the set of distance metrics,
wherein the plurality of constellation points are assigned to a particular spatial stream based on the signal strength of the spatial stream, the noise level of the spatial stream, the Signal-to-Noise Ratio (SNR) of the spatial stream, or the capacity of the spatial stream, and
wherein the spatial streams are sorted in ascending order based on signal strength and a spatial stream with the weakest signal strength is looped over more constellation points than a spatial stream with a stronger signal strength, wherein the signal strength of a spatial stream is indicated by the absolute value of the ($N_t$, $N_t$)th element in the corresponding triangular matrix R produced in QR decomposition.

26. A computer-program product for generating soft-decision output values for a set of transmitted spatial streams in a multiple-input multiple-output (MIMO) communication system, the computer-program product comprising a non-transitory computer readable medium having instructions thereon, the instructions comprising:

code for looping over a plurality of constellation points for respective transmitted spatial streams to estimate values for other transmitted streams based at least in part on Reduced List Detection (RLD);

code for determining a set of distance metrics as values of the plurality of constellation points for the respective transmitted spatial streams; and code for generating soft-decision outputs for the respective transmitted streams based at least in part on the set of distance metrics, wherein the plurality of constellation points are assigned to a particular spatial stream based on the signal strength of the spatial stream, the noise level of the spatial stream, the Signal-to-Noise Ratio (SNR) of the spatial stream, or the capacity of the spatial stream, and wherein the spatial streams are sorted in ascending order based on signal strength and a spatial stream with the weakest signal strength is looped over more constellation points than a spatial stream with a stronger signal strength, wherein the signal strength of a spatial stream is indicated by the absolute value of the $(N_t, N_t)$th element in the corresponding triangular matrix R produced in QR decomposition.

* * * * *